(12) United States Patent
Yu et al.

(10) Patent No.: US 9,286,691 B2
(45) Date of Patent: Mar. 15, 2016

(54) MOTION ESTIMATION AND COMPENSATION OF FEATURE-MOTION DECORRELATION

(75) Inventors: Weichuan Yu, Hong Kong (CN); Tianzhu Liang, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 652 days.

(21) Appl. No.: 13/259,199

(22) PCT Filed: Apr. 12, 2010

(86) PCT No.: PCT/CN2010/000479
§ 371 (c)(1),
(2), (4) Date: Sep. 23, 2011

(87) PCT Pub. No.: WO2010/118629
PCT Pub. Date: Oct. 21, 2010

(65) Prior Publication Data
US 2012/0020530 A1 Jan. 26, 2012

Related U.S. Application Data

(60) Provisional application No. 61/212,820, filed on Apr. 17, 2009.

(51) Int. Cl.
*G06T 7/20* (2006.01)
*G06T 5/00* (2006.01)
(Continued)

(52) U.S. Cl.
CPC .............. *G06T 7/2033* (2013.01); *G06T 5/003* (2013.01); *G06T 5/20* (2013.01); *G06T 5/50* (2013.01); *G06T 2207/10136* (2013.01); *G06T 2207/30004* (2013.01)

(58) Field of Classification Search
None
See application file for complete search history.

(56) References Cited

U.S. PATENT DOCUMENTS

| 5,524,636 A | 6/1996 | Sarvazyan et al. |
| 5,720,708 A | 2/1998 | Lu et al. |

(Continued)

FOREIGN PATENT DOCUMENTS

| CN | 1573810 A | 2/2005 |
| CN | 101261736 A | 4/2008 |

(Continued)

OTHER PUBLICATIONS

Yeung et al. "Feature Adaptive Motion Tracking of US Image Sequences Using Deformable Mesh" IEEE Transactions on Medical Imaging, vol. 17, No. 6, Dec. 1998. pp. 1-12.*

(Continued)

*Primary Examiner* — Chan Park
*Assistant Examiner* — Mia M Thomas
(74) *Attorney, Agent, or Firm* — Amin, Turocy & Watson, LLP

(57) ABSTRACT

The subject disclosure relates to motion estimation and compensation of feature-motion decorrelation. In an aspect, coupled filtering can be employed to solve feature-motion decorrelation problems. In further aspects, a linear convolution model can be employed to model image variation caused by motion, and an image before motion and a warped image after motion can be filtered with a pair of filters having motion parameters shared with a tissue motion model. Compensation of feature-motion decorrelation in ultrasound images demonstrates various aspects of the subject disclosure.

32 Claims, 19 Drawing Sheets

(51) Int. Cl.
*G06T 5/20* (2006.01)
*G06T 5/50* (2006.01)

(56) References Cited

U.S. PATENT DOCUMENTS

| | | | | |
|---|---|---|---|---|
| 5,876,342 A * | 3/1999 | Chen et al. | | 600/443 |
| 6,014,473 A * | 1/2000 | Hossack et al. | | 382/294 |
| 6,192,079 B1 * | 2/2001 | Sharma | | H04N 19/587 375/240.15 |
| 6,211,913 B1 * | 4/2001 | Hansen | | H04N 5/23248 348/218.1 |
| 6,270,459 B1 * | 8/2001 | Konofagou | | A61B 5/0053 600/449 |
| 6,494,834 B2 * | 12/2002 | Konofagou et al. | | 600/438 |
| 6,526,156 B1 * | 2/2003 | Black et al. | | 382/103 |
| 6,527,717 B1 | 3/2003 | Jackson et al. | | |
| 6,535,835 B1 * | 3/2003 | Rubin et al. | | 702/159 |
| 6,537,221 B2 | 3/2003 | Criton et al. | | |
| 6,567,564 B1 * | 5/2003 | van der Wal | | G06T 1/20 375/E7.093 |
| 6,659,953 B1 * | 12/2003 | Sumanaweera et al. | | 600/443 |
| 6,687,625 B2 * | 2/2004 | Srinivasan | | G01L 1/255 702/42 |
| 6,751,284 B1 * | 6/2004 | Claus et al. | | 378/22 |
| 6,810,293 B1 * | 10/2004 | Chou et al. | | 700/90 |
| 6,976,961 B2 | 12/2005 | Jackson et al. | | |
| 7,356,172 B2 | 4/2008 | Fan et al. | | |
| 7,590,264 B2 * | 9/2009 | Mattes et al. | | 382/107 |
| 7,654,959 B2 * | 2/2010 | Guracar | | 600/447 |
| 7,702,063 B2 * | 4/2010 | Koehler et al. | | 378/4 |
| 7,780,601 B2 * | 8/2010 | Guracar et al. | | 600/447 |
| 8,094,903 B2 * | 1/2012 | Zhu | | A61B 6/481 378/98.12 |
| 8,105,239 B2 * | 1/2012 | Specht | | 600/446 |
| 8,224,056 B2 * | 7/2012 | Pack et al. | | 382/131 |
| 8,270,671 B1 * | 9/2012 | Medasani et al. | | 382/103 |
| 8,320,575 B2 * | 11/2012 | Schmidt | | H04M 9/082 381/66 |
| 8,503,820 B2 * | 8/2013 | Lee et al. | | 382/275 |
| 2001/0025145 A1 * | 9/2001 | Tickner et al. | | 600/458 |
| 2003/0108220 A1 * | 6/2003 | Jepson et al. | | 382/103 |
| 2003/0158483 A1 * | 8/2003 | Jackson et al. | | 600/449 |
| 2004/0136490 A1 * | 7/2004 | Edic et al. | | 378/4 |
| 2005/0259864 A1 * | 11/2005 | Dickinson et al. | | 382/154 |
| 2007/0047788 A1 * | 3/2007 | Slablaugh et al. | | 382/128 |
| 2007/0053482 A1 * | 3/2007 | Kohler et al. | | 378/8 |
| 2007/0211928 A1 * | 9/2007 | Weng | | G01N 30/8624 382/128 |
| 2007/0217713 A1 * | 9/2007 | Milanfar et al. | | 382/299 |
| 2007/0238999 A1 * | 10/2007 | Specht | | 600/437 |
| 2007/0282202 A1 * | 12/2007 | Maurice et al. | | 600/438 |
| 2007/0296833 A1 * | 12/2007 | Corcoran et al. | | 348/231.99 |
| 2008/0091678 A1 * | 4/2008 | Walker et al. | | 707/6 |
| 2008/0100624 A1 * | 5/2008 | Aharon et al. | | 345/424 |
| 2008/0175453 A1 * | 7/2008 | Hao et al. | | 382/128 |
| 2008/0285880 A1 * | 11/2008 | Florent | | G06T 5/20 382/260 |
| 2009/0129651 A1 * | 5/2009 | Zagzebski | | G01S 7/52046 382/131 |
| 2010/0034446 A1 * | 2/2010 | Zhu | | G06K 9/38 382/130 |
| 2010/0121183 A1 * | 5/2010 | Taguchi et al. | | 600/427 |
| 2010/0165206 A1 * | 7/2010 | Nestares et al. | | 348/607 |
| 2010/0249592 A1 * | 9/2010 | Langeland et al. | | 600/443 |
| 2011/0142313 A1 * | 6/2011 | Pack et al. | | 382/131 |
| 2011/0208038 A1 * | 8/2011 | Konofagou et al. | | 600/410 |
| 2012/0050074 A1 * | 3/2012 | Bechtel et al. | | 340/988 |
| 2012/0143042 A1 * | 6/2012 | Palmeri | | A61B 8/5207 600/411 |
| 2012/0163672 A1 * | 6/2012 | McKinnon | | 382/106 |
| 2013/0033612 A1 * | 2/2013 | Wu | | G06T 5/002 348/208.6 |
| 2013/0315501 A1 * | 11/2013 | Atanassov et al. | | 382/275 |
| 2013/0322728 A1 * | 12/2013 | Jacobs et al. | | 382/132 |
| 2014/0112544 A1 * | 4/2014 | Yu et al. | | 382/107 |

FOREIGN PATENT DOCUMENTS

| | | |
|---|---|---|
| CN | 101292265 A | 10/2008 |
| CN | 101310302 A | 11/2008 |
| WO | 2007138526 A2 | 12/2007 |

OTHER PUBLICATIONS

Ju et al. "3D volume reconstruction of a mouse brain from histological sections using warp filtering" Journal of Neuroscience Methods xxx (2006) pp. 1-17.*

Chen et al. "Optimizing INTRA/INTER Coding Mode Decisions" Proc. of International Symposium on Multimedia Information Processing, Dec. 1997 pp. 1-8.*

Yu, W., et al., "Towards pointwise motion tracking in echocardiographic images—comparing the reliability of different features for speckle tracking". Medical Image Analysis, vol. 10, 2006, pp. 495-508.

Yeung, F., et al., "Feature-adaptive motion tracking of ultrasound image sequences using a deformable mesh". IEEE Transactions on Medical Imaging, vol. 17, No. 6, 1998, pp. 945-956.

Palmeri, M., et al., "A finite-element method model of soft tissue response to impulsive acoustic radiation force". IEEE Transactions on Ultrasonics, Ferroelectrics, and Frequency Control, vol. 52, No. 10, 2005, pp. 1699-1712, 23 pages.

Pellot-Barakat, C., et al, "Ultrasound elastography based on multiscale estimation of regularized displacement fields". IEEE Transactions on Medical Imaging, vol. 23, 2004, pp. 153-163.

Valckx, F.M.J., et al., "Characterization of echographic image texture by cooccurrence matrix parameters". Ultrasound in Medicine and Biology, vol. 23, No. 4, 1997, pp. 559-571, 13 pages.

Chaturvedi, et al., "2-D Companding for Noise Reduction in Strain Imaging". IEEE Transactions on Ultrasonics, Ferroelectrics, and Frequency Control, vol. 45, No. 1, Jan. 1998, 13 pages.

Chaturvedi, et al., "Testing the Limitations of 2-D Companding for Strain Imaging Using Phantoms". IEEE Transactions on Ultrasonics, Ferroelectrics, and Frequency Control, vol. 45, No. 4, Jul. 1998, 10 pages.

Lubinski, et al., "Adaptive Strain Estimation Using Retrospective Processing". IEEE Transactions on Ultrasonics, Ferroelectrics, and Frequency Control, vol. 46, No. 1, Jan. 1999, 11 pages.

Meunier, "Tissue motion assessment from 3D echographic speckle tracking". 0031-9155/98/051241+14$19.50 (c)1998 IOP Publishing Ltd., 14 pages.

Barakat, et al., "Ultrasound Elastography Based on Multiscale Estimations of Regularized Displacement Fields". IEEE Transaction on Medical Imaging, vol. 23, No. 2, Feb. 2004, 11 pages.

Skovoroda, et al., "Nonlinear Estimation of the Lateral Displacement Using Tissue Incompressibility". IEEE Transactions on Ultrasonics, Ferroelectrics, and Frequency Control, vol. 45, No. 2, Mar. 1998, 13 pages.

Trahey, et al., "Angle Independent Ultrasonic Detection of Blood Flow". IEEE Transactions on biomedical engineering, vol. BME-34, No. 12, Dec. 1987.

International Search Report for Application No. PCT/CN2010/000479, dated Jul. 15, 2010. 2 pgs.

* cited by examiner

| Parameter | Value |
|---|---|
| Central Frequency of Ultrasound Transducer | 4MHz (MegaHertz) |
| Ultrasound Speed | 1540m/s (Meter/Second) |
| Resolution Cell Size | 1mm × 1mm × 0.5mm (millimeter) |
| Range Along x-Axis | -5mm ~ 5mm |
| Range Along y-Axis | -5mm ~ 5mm |
| Range Along z-Axis (Beam Direction) | 0mm ~ 5mm |
| Voxel Size | 0.0625mm × 0.0625mm × 0.03125mm |

MOTION ESTIMATION AND COMPENSATION OF FEATURE-MOTION DECORRELATION

CROSS REFERENCE TO RELATED APPLICATIONS

This application is a US national stage application of PCT Application No. PCT/CN2010/000479 filed Apr. 12, 2010, which claims priority U.S. Provisional Patent Application Ser. No. 61/212,820, filed on Apr. 17, 2009, and entitled A COUPLED FILTERING METHOD FOR TISSUE MOTION ANALYSIS USING ULTRASOUND IMAGES, the entirety of which is hereby incorporated by reference.

TECHNICAL FIELD

The subject disclosure relates to image motion analysis, and more particularly to motion estimation and compensation of feature-motion decorrelation in ultrasound images.

BACKGROUND

Ultrasound-based diagnostic imaging has achieved widespread acceptance in clinical use. For example, modern ultrasound imaging diagnostic systems and techniques are commonly used to produce two-dimensional (2-D) or three-dimensional (3-D) ultrasound images of internal features of patients. Conventional ultrasound systems operate in various image modes (e.g., brightness mode or B-Mode, Doppler mode, etc.) to acquire ultrasound images for diagnoses. As a further example, traditional ultrasound systems can provide a color flow image, e.g., in a Doppler mode, that can represent velocities of moving objects such as blood flow, heart motions, etc. Such systems can be limited in that they measure motion parallel to the beam direction. Motion that is perpendicular to the beam direction typically cannot be measured. Moreover, in many instances, it is desirable to obtain angle-independent measurements that make use of the unique interference patterns called speckles, which are formed when ultrasound waves are reflected from underlying tissue scatterers and interfere with each other.

Accurate tissue motion estimation is beneficial in many diagnostic ultrasound applications. For instance, accurate 3-D tissue deformation analysis, or tissue motion estimation, finds many applications in ultrasound-based diagnostic imaging. As an example, accurate tissue motion estimation is especially helpful in the fields of elastography (e.g., for tumor detection) and echocardiography (e.g., for heart disease diagnosis). Therefore, accurate tissue deformation analysis via speckle tracking has great potential in clinical applications.

Speckle tracking assumes that the speckles in images remain unchanged before and after tissue motion. However, this assumption is true only for certain types of tissue motion (such as translation). In practice, speckles do change after tissue deformation, resulting in a difficult feature-motion decorrelation problem. Thus, systems employing typical speckle tracking-based estimation results do not use such results to represent the underlying true tissue motion.

To achieve accurate tissue motion estimation, compensation of feature-motion decorrelation can be performed to represent underlying true tissue motion. However, feature-motion decorrelation remains a largely open problem for ultrasound image-based tissue deformation analysis. Compensation of feature-motion decorrelation has been shown to be an ill-posed inverse problem. As accurate tissue motion estimation is beneficial in many diagnostic applications, feature-motion decorrelation can pose a challenge to implementing accurate tissue deformation analysis for ultrasound imaging clinical applications.

To alleviate the feature-motion decorrelation problem, typical solutions use relatively high frame rates (e.g., 200 frames per second in 2-D ultrasound imaging) during imaging so that the deformation between two neighboring ultrasound images is small enough to guard against any significant image variation. However, such high frame rates have been difficult to achieve for 3-D ultrasound imaging. In addition, while such high frame rates are possible in 2-D ultrasound imaging, out-of-plane motion (e.g., the tissue part may not always stay in the same 2-D imaging plane as assumed) hampers the wide applications of 2-D ultrasound imaging in tissue deformation analysis. Also, the problems of feature-motion decorrelation (e.g., the problem of accurate tissue deformation analysis) remain unaddressed by high frame rate solutions.

Conventional image-analysis approaches to the problem of feature-motion decorrelation either place additional constraints to limit the search space during motion tracking, or model image variations caused by tissue motion. However, regardless of the approach posed by conventional solutions, neither adequately addresses the problems of accurate tissue deformation analysis (e.g., feature-motion decorrelation).

For example, while constraint-based image-analysis approaches (e.g., tissue incompressibility models, deformable mesh method, finite-element method, multi-scale estimation with regularized displacement fields, etc.) address the larger problem by focusing on the end result, such approaches constrain the solution space rather than resolving the issue of feature-motion decorrelation.

As a further example, modeling image variations caused by tissue motion (e.g., 2-D companding) can model 2-D image variations caused by tissue motion with a 2-D scaling plus a shift. 2-D companding uses a multi-scale framework to estimate the scaling and shift parameters. For instance, after warping an image taken after tissue deformation, 2-D companding can estimate tissue displacement and can further derive tissue strain distribution. However, while companding can provide an acceptable approximation of image variation for a limited range of tissue deformation, typical systems employing companding do not provide acceptable results for large tissue deformation.

It is thus desired to provide enhanced systems, devices, and methodologies for compensation of feature-motion decorrelation to facilitate tissue deformation analysis in ultrasound imaging systems that improve upon these and other deficiencies. The above-described deficiencies of typical ultrasound imaging systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

In various non-limiting embodiments of the disclosed subject matter, systems, devices, and methodologies that facilitate compensation of feature-motion decorrelation are described. For instance, in exemplary implementations, coupled filtering can be performed on image information (e.g., information associated with a pair of images before and after a motion of interest). Exemplary embodiments can output motion parameter(s) associated with the motion, which, among other things, can allow accurate tissue motion estimation in ultrasound imaging.

Accordingly, various embodiments for compensation of feature-motion decorrelation are described herein. In one aspect, methodologies for compensation of feature-motion decorrelation are provided that perform a coupled filtering on image information based in part on initialized motion parameter(s) to generate coupled filtering results. In addition, methodologies can further include updating the initialized motion parameter(s) based in part on the coupled filtering results in a predefined search to create updated motion parameter(s). In a further aspect of exemplary methodologies for compensation of feature-motion decorrelation, updated motion parameter(s) can be output based in part on determining that the coupled filtering results meet one or more acceptance criteria.

In other exemplary implementations, systems that compensate for feature-motion decorrelation can comprise a computerized component that performs a coupled filtering operation on before-motion image information and warped after-motion image information to create coupled filtering results. In a further aspect, a warping operation that creates the warped after-motion image information and the coupled filtering operation share a set of motion parameter(s) that facilitates calculation of a matching metric for the coupled filtering results. In addition, in other aspects of disclosed systems, the computerized component can perform a point spread function filtering of the warped after-motion image information and a modified point spread function filtering of the before-motion image information. In yet other aspects of disclosed systems, the computerized component can perform a Gaussian-weighted cosine filtering of the warped after-motion image information and an affine modified Gaussian-weighted cosine filtering of the before-motion image information.

In yet other embodiments of the disclosed subject matter, a coupled filtering device that facilitates compensation of feature-motion decorrelation is described. For instance, an exemplary coupled filtering device can comprise an image warping component configured to image warp a first subset of input image information. In a further aspect, an exemplary coupled filtering device can further comprise a filtering component configured to filter a second subset of input image information based in part on initialized motion parameter(s) and configured to filter the warped first subset of input image information to obtain coupled filtering results.

These and other embodiments are described in more detail below.

BRIEF DESCRIPTION OF THE DRAWINGS

Various non-limiting embodiments are further described with reference to the accompanying drawings in which:

FIG. 9 tabulates exemplary non-limiting 3-D ultrasound image simulation parameters;

DETAILED DESCRIPTION

Overview

Figure 1:
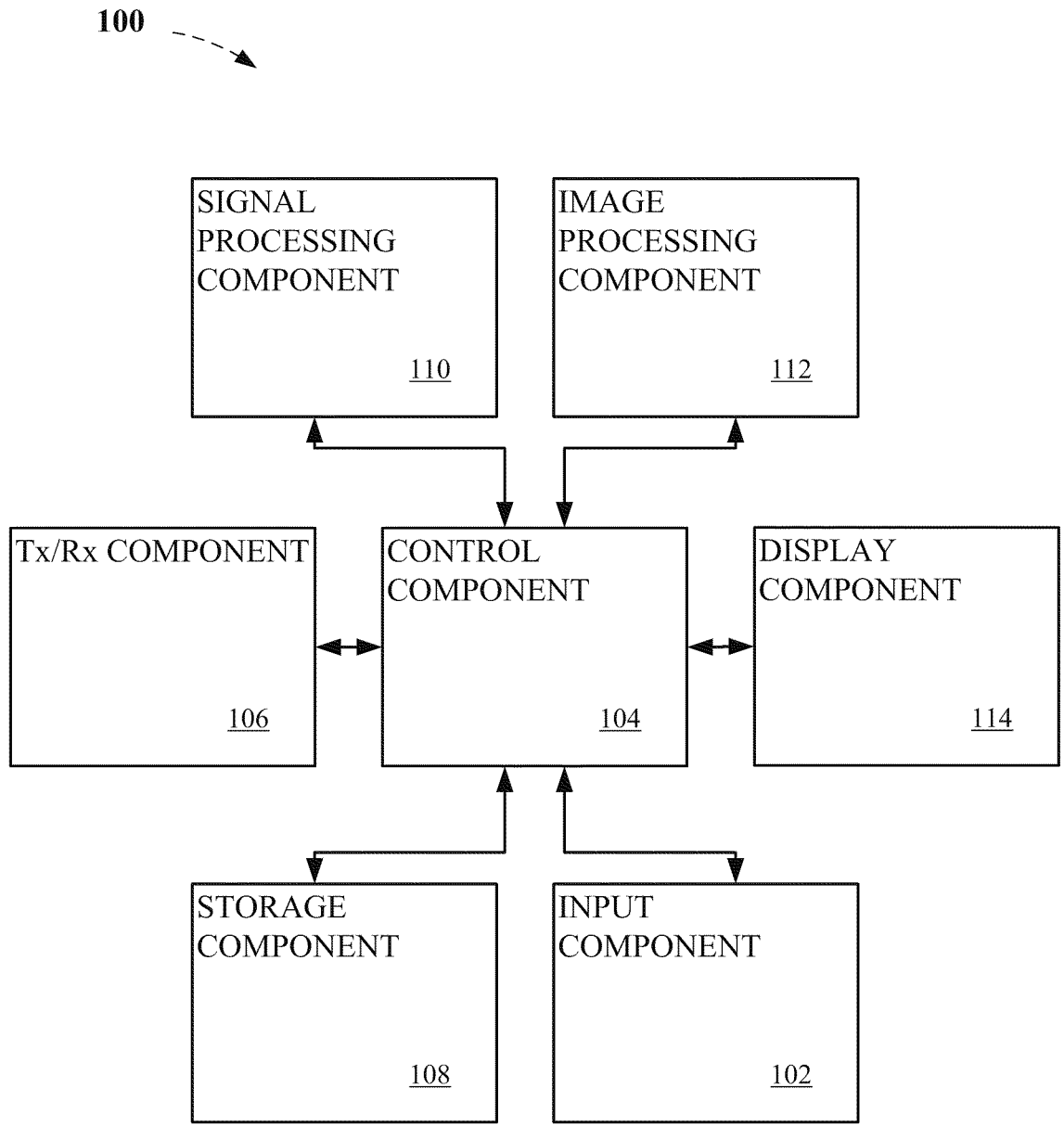
FIG. 1 illustrates a functional block diagram of an exemplary non-limiting embodiment of an ultrasound system, to which implementations of the disclosed subject matter can be applied.

While a brief overview is provided, certain aspects of the disclosed subject matter are described or depicted herein for the purposes of illustration and not limitation. Thus, variations of the disclosed embodiments as suggested by the disclosed apparatuses, systems and methodologies are intended to be encompassed within the scope of the subject matter disclosed herein. For example, the various embodiments of the apparatuses, systems and methodologies of the disclosed subject matter are described in the context of ultrasound and tissue imaging. However, as further detailed below, various exemplary implementations can be applied to other areas of imaging, without departing from the subject matter described herein.

As used herein, the term "information" in the context of "image information" is intended to refer to one or more items of data that is descriptive of, is associated with, is a representation of a physical measurement of, or otherwise relates to an observable phenomenon having one or more characteristics (e.g., physical, chemical, electrical, mechanical, visual, or other characteristics) that can be represented by one or more images. As further described herein, the terms "before-motion" and "after-motion" can refer to before and after a point in time in which a particular motion takes place. Note that, as further described below, although the use of terms "before" and "after" regarding motion can refer to a situation where there is no absolute motion in the "before-motion" context relative to a frame of reference other than the "after-motion" context, various embodiments of the disclosed subject matter are not so limited. In other words, relative to another frame of reference (e.g., other than the after-motion frame of reference), the terms "before-motion" and "after-motion" can refer to points in time "before" and "after" any particular motion of interest (e.g., translation, rotation, shearing, scaling, etc., and any combination thereof, regardless of reference point, axis, or frame).

As described in the background, compensation of feature-motion decorrelation is beneficial in accurate tissue motion estimation. The disclosed subject matter provides systems, devices, and methodologies for compensation of feature-motion decorrelation.

For instance, exemplary non-limiting implementations of feature-motion decorrelation employ coupled filtering to resolve the feature-motion decorrelation problem. As an illustrative example, after explicitly modeling image variation(s) caused by tissue deformation, an image before tissue deformation and a warped image after tissue deformation can be filtered with a pair of filters, respectively. According to various non-limiting embodiments, the two filtered images are identical to each other. Since various implementations of coupled filtering retain object deformation parameters (e.g., tissue deformation parameters, motion parameter(s), etc.), feature-based tracking can estimate the underlying tissue deformation parameters.

In various embodiments described herein, a linear convolution model can be employed with a tissue motion model, which forms the basis of the coupled filtering method. For example, a complete, or substantially complete, compensation of image variation caused by locally affine tissue motion can be performed by applying the coupled filtering. Advantageously, various embodiments of the disclosed subject matter can provide a robust analysis of tissue deformation using ultrasound images. Thus, various embodiments can compensate for ultrasound image variations caused by tissue deformation (e.g., feature-motion decorrelation) by applying the two different filters to an ultrasound image taken before tissue deformation and its counterpart taken after tissue deformation, respectively.

According to an aspect, implementations can employ two filters that are coupled together in that one filter is a deformed version of the other. According to a further aspect, implementations can compensate for feature-motion decorrelation by warping the ultrasound image taken after tissue deformation before applying the respective filter. Because deformation parameters (e.g., tissue deformation parameters, motion parameter(s), etc.) are embedded in the warping and filtering in exemplary embodiments, accurate tissue deformation analysis becomes feasible by searching for optimal parameters to be used for warping and filtering. In addition, because coupled filtering retains tissue motion parameters during the modification of ultrasound images, it allows the search for equality relationships between two modified ultrasound images during the tissue deformation analysis. Thus, various embodiments of the disclosed subject matter can provide a robust analysis of tissue deformation using, for example, ultrasound images.

Accordingly, FIG. 1 illustrates a functional block diagram of an exemplary non-limiting embodiment of an ultrasound system 100, to which implementations of the disclosed subject matter can be applied. According to various implementations, components described herein can be configured to perform applicable methodologies, or portions thereof, by standard software programming techniques and executing the configured components (e.g., computerized components), or portions thereof, on a computer processor. To that end, exemplary ultrasound system 100 can include an input component 102 allowing a user or other system component to input setup or configuration information, for example, on a region of interest, adjustment of system parameters, information affecting initialized motion parameter(s), one or more acceptance criteria, constraints, etc.

Exemplary ultrasound system 100 can further include a control component 104. Control component 104 can be configured to control transmission/reception (Tx/Rx) of ultrasound signals based on the setup information of the ROI. In addition, for various aspects described below regarding, for example, FIGS. 2-7, the control component 104 can control Tx/Rx of the ultrasound signals such that Tx/Rx of ultrasound RF signals can be performed. In addition, the control component 104 can be configured to control other operations of the ultrasound system 100, as further described below.

As shown in FIG. 1, the ultrasound system 100 can further include a Tx/Rx component 106. The Tx/Rx component 106 can transmit/receive the ultrasound RF signals to/from a target object. In other aspects, the Tx/Rx component 106 can include a probe (not shown) for generating the ultrasound signal and the receive signal. In addition, Tx/Rx component 106 can further include a beam former (not shown) for transmit focusing and receive focusing. The ultrasound system 100 can further include a storage component 108, for example, to store signals outputted from the Tx/Rx component 106.

In a further aspect, ultrasound system 100 can include a signal processing component 110. Signal processing component 110 can be configured to process signals to provide 2-D or 3-D image data representing a 2-D or 3-D ultrasound image of the target object, among other things. Signal processing component 110 can be further configured to perform signal processing upon a signal for image optimization (e.g., gain adjustment, etc.).

In yet other aspects, ultrasound system 100 can further include an image processing component 112 that can form 2-D or 3-D images based in part on signals outputted from the signal processing component 110. In addition, ultrasound system 100 can include a display component 114 for displaying 2-D or 3-D images.

Thus, an exemplary ultrasound system 100, according to aspects of the disclosed subject matter, can comprise one or more of input component 102, control component 104, Tx/Rx component 106, storage component 108, signal processing component 110, image processing component 112, and display component 114, among other possible components or subcomponents as described herein.

As described herein, an ultrasound system 100, a coupled filtering component or device 202 as described below regarding FIGS. 2-3, or a component or subcomponent thereof, can facilitate the performance of portions of methodologies described herein via, for example, input component 102, control component 104, storage component 108, signal processing component 110, image processing component 112, and so on. In addition, as described below regarding FIGS. 18-19, various aspects of methodologies, systems, components, device, and portions thereof, can be performed by a general purpose computer executing software configured to perform the functionality as described herein, though the embodiments are not so limited.

As a result, an ultrasound system 100 as described herein can comprise a computerized component (e.g., input component, 102, control component 104, signal processing component 110, image processing component 112, and so on, or portions thereof) that can perform a coupled filtering operation on before-motion image information and warped after-motion image information to create coupled filtering results. As an example, as further described in detail below, a warping operation that creates the warped after-motion image information and the coupled filtering operation share a set of motion parameter(s) that facilitates calculation of a matching metric for the coupled filtering results. In addition, according to a further aspect, the computerized component of system 100 can be configured to perform a coupled filtering operation in the form of point spread function filtering of the warped after-motion image information and modified point spread function filtering of the before-motion image information, where the warping operation is an affine warping operation. According to yet another aspect, the computerized component of system 100 can be configured to perform a coupled filtering operation in the form of a Gaussian-weighted cosine filtering of the warped after-motion image information and an affine modified Gaussian-weighted cosine filtering of the before-motion image information, where the warping operation is an affine warping operation.

Figure 2:
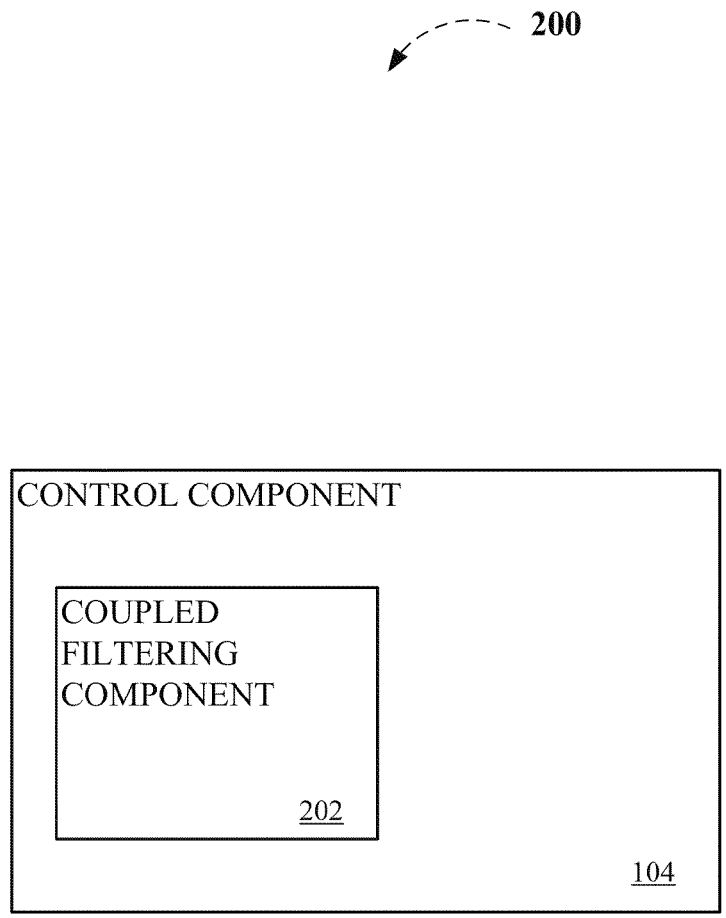
FIG. 2 depicts a functional block diagram of an illustrative embodiment of a control component that facilitates compensation of feature-motion decorrelation according to aspects of the disclosed subject matter.
Figure 3:
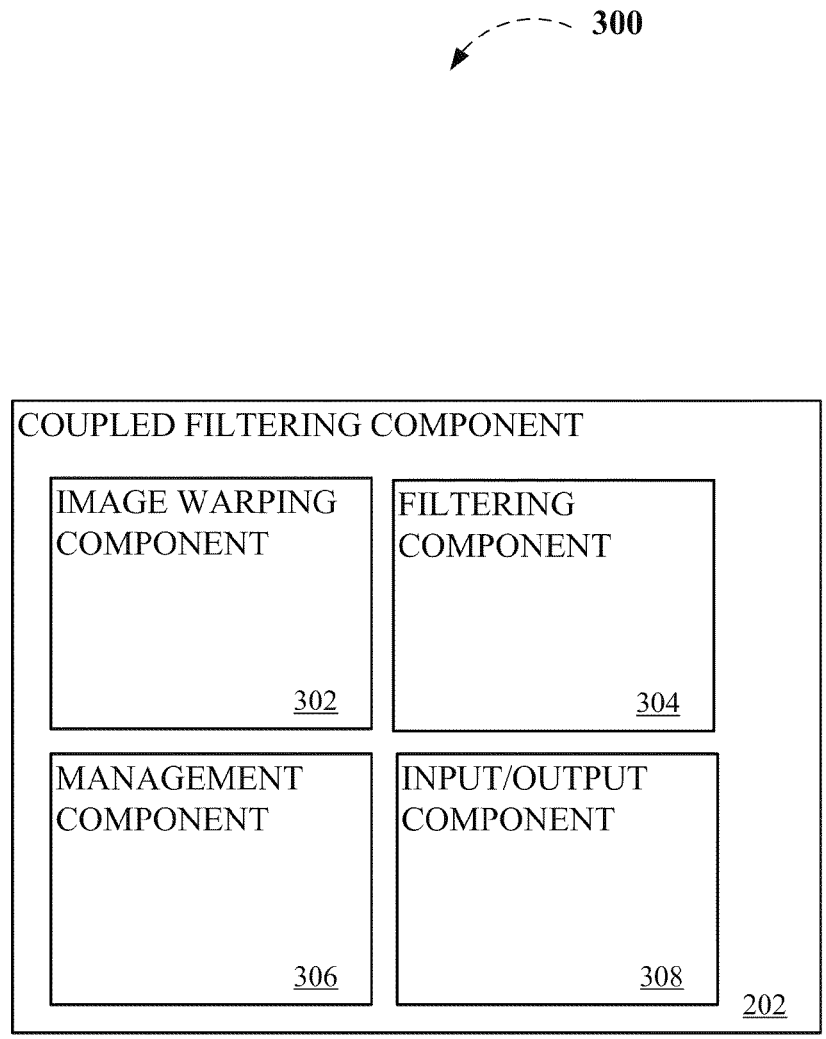
FIG. 3 depicts a functional block diagram of an exemplary coupled filtering component or device that facilitates feature motion decorrelation according to further aspects of the disclosed subject matter.

FIG. 2 depicts a functional block diagram of an illustrative embodiment of a control component 104 that facilitates compensation of feature-motion decorrelation according to aspects of the disclosed subject matter. For instance, in exemplary embodiments control component 104 can comprise a coupled filtering component 202 that facilitates compensation of feature-motion decorrelation as further described below, for example, regarding FIG. 3. As an example, FIG. 3 depicts a functional block diagram of an exemplary coupled filtering component or device 202 that facilitates feature compensation of motion decorrelation according to further aspects of the disclosed subject matter.

In various non-limiting embodiments, coupled filtering component or device 202 can comprise an image warping component 302 that can be configured to image warp a first subset of input image information (e.g., after-motion image information). Coupled filtering component or device 202 can further comprise a filtering component 304 that can be configured to filter a second subset of input image information (e.g., before-motion image information) based on initialized motion parameter(s) and to filter the warped first subset of input image information to obtain coupled filtering results. For instance, according to an aspect, the image warping component 302 can be configured to affine warp the first subset of input image information. In a further aspect, filtering component 304 can be further configured to filter the affine warped first subset of input image information with the original point spread function and to filter the second subset of input image information with a modified point spread function. In yet another aspect, filtering component 304 can be further configured to filter the affine warped first subset of input image information with a Gaussian-weighted cosine filter and to filter the second subset of input image information with an affine modified Gaussian-weighted cosine filter.

In further non-limiting implementations, coupled filtering device 202 can further include a management component 306 that can be configured to generate an update to motion parameter(s) (e.g., optimal motion parameter(s), motion parameter(s) as updated candidates, etc.) based on the coupled filtering results. For example, management component 306 can be configured to determine whether the coupled filtering results meet one or more acceptance criteria. As further described below, one or more acceptance criteria can be used by management component 306 to determine whether a metric of matching (e.g., a matching metric) between the coupled filtering results achieve maximal performance levels (e.g., optimal compensation of feature-motion decorrelation).

In still other exemplary embodiments, management component 306 can be configured to output the update (e.g., updated optimal motion parameter(s)) if the search for optimal motion parameters meets the one or more accomplishment criteria and to adjust the motion parameter (e.g., motion parameter(s) as candidates) if the search for optimal motion parameters does not meet the one or more accomplishment criteria, as further described below regarding FIGS. 4-8. In this manner, the management component 306 can facilitate repeating the coupled filtering in order to search for optimal motion parameter(s).

In yet another non-limiting embodiment, coupled filtering component or device 202 can comprise an input/output component 308 that can be configured to facilitate, for example, receiving input image information (e.g., before-motion image information, after-motion image information, etc.), outputting optimal (e.g. global or local optimum) or other motion parameter(s), receiving initialized motion parameter(s), receiving user or automated inputs associated with one or more acceptance criteria, receiving a constraint (e.g., a tissue incompressibility constraint, search space constraint, etc.), or receiving or transmitting other inputs or outputs associated with coupled filtering or compensation of feature-motion decorrelation as described herein.

In view of the systems, components, and devices described supra, methodologies that can be implemented in accordance with the disclosed subject matter will be better appreciated with reference to the flowcharts of FIGS. 4-8. While for purposes of simplicity of explanation, the methodologies are shown and described as a series of blocks, it is to be understood and appreciated that such illustrations or corresponding descriptions are not limited by the order of the blocks, as some blocks may occur in different orders and/or concurrently with other blocks from what is depicted and described herein. Any non-sequential, or branched, flow illustrated via a flowchart should be understood to indicate that various other branches, flow paths, and orders of the blocks, can be implemented which achieve the same or a similar result. Moreover, not all illustrated blocks may be required to implement the methodologies described hereinafter.

Speckle Formation and Tissue Dynamics Overview

According to a linear convolution model, radio frequency (RF) signals associated with an ultrasound image can be described as a convolution between a point spread function (PSF) and a set of scatterers (e.g., features or objects in a region of interest that reflect ultrasound waves) within a resolution cell. For instance, in the far field of a transducer (e.g., Tx/Rx component 106), a PSF can be described as a Gaussian-shaped cosine function, for example, as in Equation 1:

$$H(X) = e^{-\frac{1}{2}X^T \Gamma X} \cos(2\pi X^T U_0) \quad \text{(Eqn. 1)}$$

where X can denote the 3-D image coordinates and $\Gamma$ can denote a 3×3 diagonal matrix with Gaussian variance-related elements $$\frac{1}{\sigma_c^2}, \frac{1}{\sigma_g^2}, \frac{1}{\sigma_z^2},$$

respectively. Here $U_0 = (0, 0, u_z)^T$ can denote the spatial frequency of an ultrasound transducer (e.g., Tx/Rx component 106). According to an aspect, an ultrasound beam direction of the transducer (e.g., Tx/Rx component 106) can be aligned with the z-axis.

In addition, a tissue scatterer can be modeled as a 3-D Dirac function, for example, according to Equation 2

$$T_n(X;X_n) = a_n \delta(X - X_n) \quad \text{(Eqn. 2)}$$

with $X_n$ denoting the location of the scatterer and $a_n$ denoting the reflectance coefficient ($0 < a_n < 1$). Thus, in various embodiments, an RF signal can be represented, as an example, as in Equation 3:

$$I(X;X_n) = \sum_{n=1}^{N} T_n(X;X_n) * H(X) \quad \text{(Eqn. 3)}$$

where N can denote the number of scatterers in the resolution cell, and where * denotes a convolution operation.

In exemplary non-limiting embodiments of the disclosed subject matter, it can be assumed that tissue motion is locally affine. Accordingly, a new location $x_n$ of the tissue scatterer after affine motion can be described, for example, according to Equation 4:

$$x_n = MX_n + T \quad \text{(Eqn. 4)}$$

where M can denote a 3×3 matrix describing rotation, shearing, and scaling of the scatterer pattern, and T can denote a 3×1 vector describing 3-D translation.

As a result, in exemplary embodiments, displacement ($d_n$) can be calculated as a difference between $x_n$ and $X_n$, for example, according to Equation 5:

$$d_n = x_n - X_n = (M-I)X_n + T \quad \text{(Eqn. 5)}$$

where I can denote a 3×3 identity matrix.

Exemplary Coupled Filtering Methodologies

Various embodiments of the disclosed subject matter provide methodologies for compensation of feature-motion decorrelation and/or coupled filtering as described below with reference to FIGS. 4-8. As described below, because the same, or substantially the same, motion parameters can be embedded in warping and filtering, accurate tissue motion analysis can be advantageously performed according to the disclosed subject matter by, for example, searching for optimal motion parameter(s) during warping and filtering. As described below, various embodiments as described herein can be used for analyzing both 2-D image pairs and 3-D image pairs (e.g., 2-D and 3-D ultrasound image pairs). In addition, coupled filtering as described can be applied to 2-D and 3-D image sequence analysis (e.g., 2-D and 3-D ultrasound image sequence analysis) in that coupled filtering can be applied to two neighboring frames in such sequences repeatedly.

Figure 4:
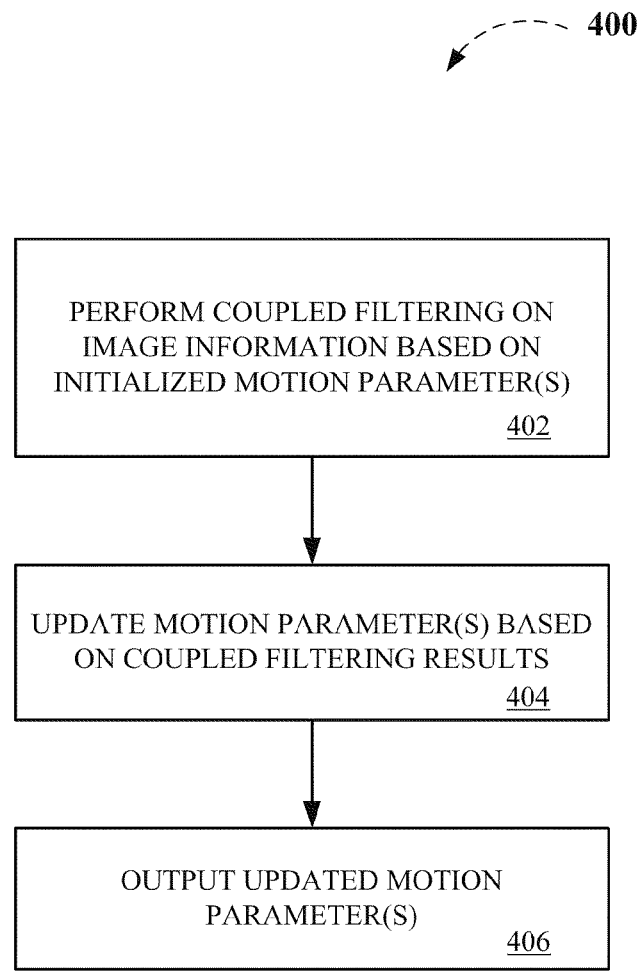
FIG. 4 depicts a flowchart illustrating exemplary non-limiting methodologies for compensation of feature-motion decorrelation as described herein.

For example, FIG. 4 depicts a flowchart illustrating exemplary non-limiting methodologies 400 for compensation of feature-motion decorrelation as described herein. For instance, methodologies 400 can include performing at 402 a coupled filtering, as described below regarding FIGS. 5-8, on image information based on initialized motion parameter(s) to generate coupled filtering results. For instance, image information can include input image information comprising, for example, before-motion image information and after-motion image information. In addition, at 402, coupled filtering can comprise image warping a subset of the image information (e.g., after-motion image information). For example, at 402, methodologies 400 can comprise affine warping the after-motion image information.

Thus, at 402, methodologies 400 can include filtering the warped after-motion image information with an original PSF and filtering the before-motion image information with a modified PSF (e.g., a PSF modified by a specific motion model, etc.), as further described below regarding FIGS. 5-8. In further non-limiting aspects of methodologies 400, at 402, coupled filtering can include filtering the affine warped after-motion image information with a Gaussian-weighted cosine filter and filtering the before-motion image information with an affine modified Gaussian-weighted cosine filter.

According to various embodiments, methodologies 400 can further include updating initialized optimal motion parameter(s) based on the coupled filtering results. For example, at 404, initialized optimal motion parameter(s) can be updated based on computing a matching metric, as described regarding FIGS. 5-8, between the coupled filtering results. For instance, at 404, exemplary methodologies 400 can comprise various calculations for use as a matching metric (e.g., correlation coefficients, sum of squared distance, the sum of absolute distance between the coupled filtering results, etc.). For instance, as described below regarding FIGS. 5-8, at 404, methodologies 400 can include determining whether coupled filtering results indicate that current motion parameters (e.g., M or T used in a current pass of methodologies 400) are acceptable candidate motion parameters for updating the optimal motion parameters used in a previous pass of methodologies 400. If it is determined that current motion parameters are acceptable update candidates, then one or more motion parameters used in a previous pass through methodologies 400 (or one or more initialized motion parameters) can be updated. If it is determined that current motion parameters are not acceptable update candidates, then the one or more motion parameters used in a previous pass through methodologies 400 (e.g., where M and T were used in a previous pass of methodologies 400, initialized M and T, etc.) can be retained.

At 406, methodologies 400 can further include outputting updated optimal motion parameter(s) based on determining the search for optimal motion parameters meets the one or more accomplishment criteria. For instance, methodologies 400 can include determining whether the search for optimal motion parameters meets the one or more accomplishment criteria. For example, as described below regarding FIGS. 5-8, one or more accomplishment criteria can be based on a matching metric as described above, accomplishment of a predefined search, or other criteria that facilitate judging whether feature-motion decorrelation has been addressed (e.g., compensated). Thus, the one or more accomplishment criteria can facilitate judging whether feature-motion decorrelation has been optimally addressed (e.g., best or optimally compensated), or whether feature-motion decorrelation has been addressed to some lesser extent, based on, for example, tradeoffs of compensation quality, speed, and other considerations of a system designer.

Figure 5:
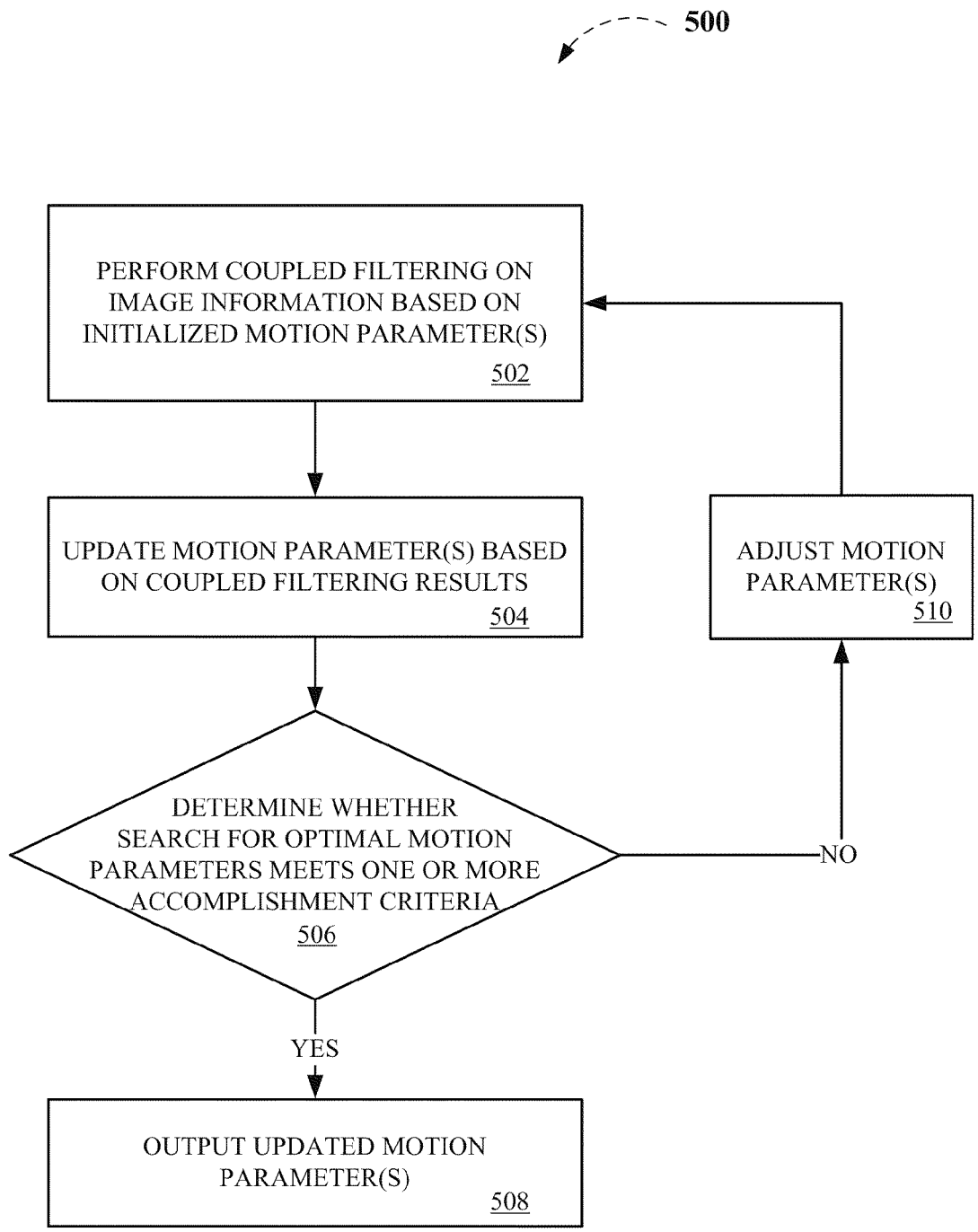
FIG. 5 is a flowchart depicting further non-limiting methodologies for compensation of feature-motion decorrelation according to the disclosed subject matter.

FIG. 5 is a flowchart depicting further non-limiting methodologies 500 for compensation of feature-motion decorrelation according to the disclosed subject matter. For example, at 502, methodologies 500 can include performing a coupled filtering, as described below regarding FIGS. 6-8, on image information based on initialized motion parameter(s) to generate coupled filtering results. As a further example, image information can comprise input image information that can include, for example, before-motion image information and after-motion image information. In addition, at 502, coupled filtering can comprise image warping a subset of the image information (e.g., after-motion image information). For instance, at 502, methodologies 500 can comprise affine warping the after-motion image information.

Figure 6:
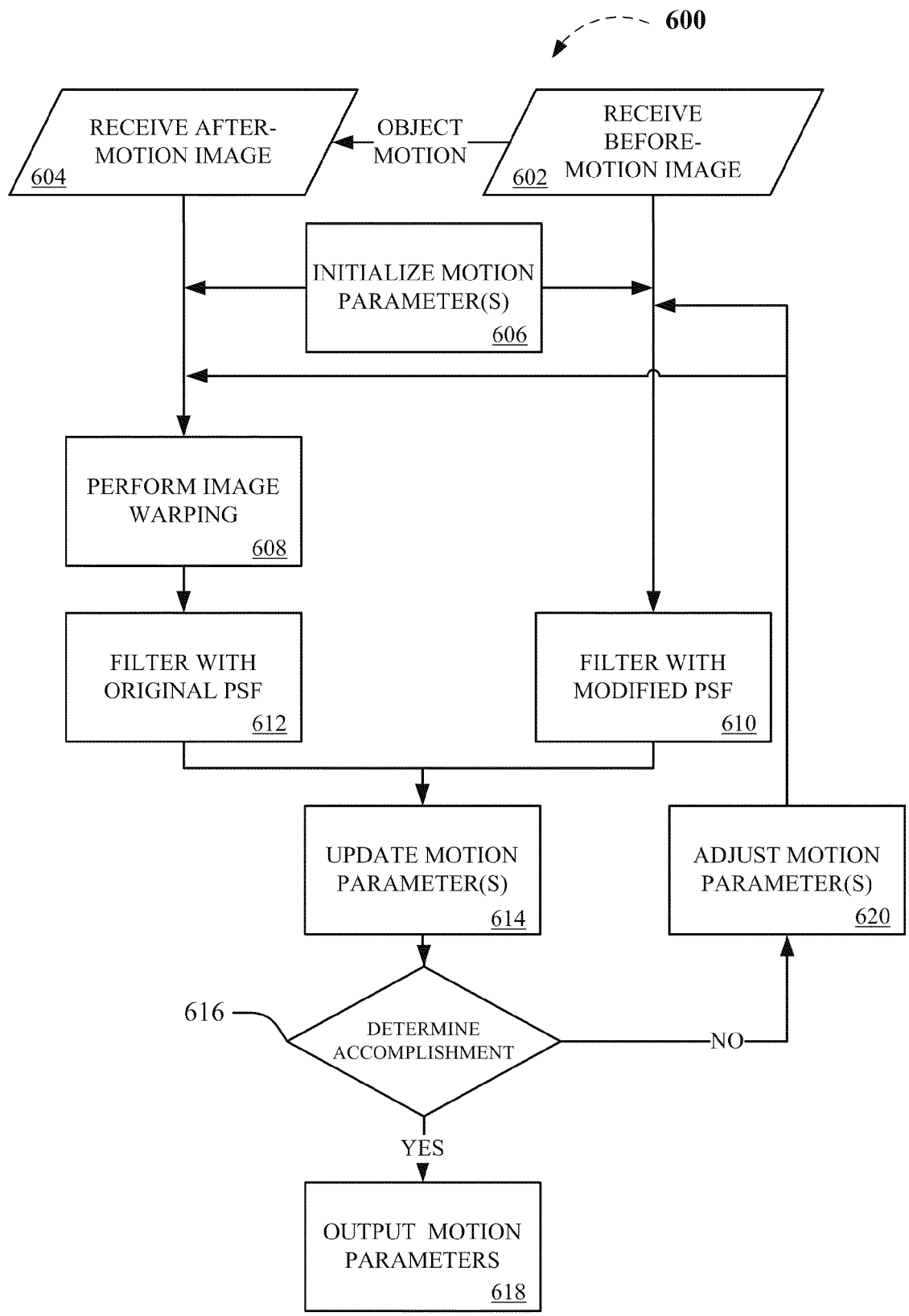
FIG. 6 depicts further aspects of methodologies for compensation of feature-motion decorrelation as described herein.

Accordingly, at 502, methodologies 500 can include filtering the warped after-motion image information with an original PSF and filtering the before-motion image information with a modified PSF (e.g., a PSF modified by a specific motion model, etc.), as further described below regarding FIGS. 6-8. In other non-limiting aspects of methodologies 500, coupled filtering can include filtering the affine warped after-motion image information with a Gaussian-weighted cosine filter and filtering the before-motion image information with an affine modified Gaussian-weighted cosine filter at 502.

According to various embodiments, methodologies 500 can further include updating optimal initialized motion parameter(s) based on the coupled filtering results. For example, at 504, initialized optimal motion parameter(s) can be updated based on computing a matching metric, as described regarding FIGS. 6-8, between the coupled filtering results. For instance, at 504, exemplary methodologies 500 can comprise various calculations for use as a matching metric (e.g., correlation coefficients, sum of squared distance, the sum of absolute distance between the coupled filtering results, etc.). As an example, as described below regarding FIGS. 6-8, at 504, methodologies 500 can include determining whether coupled filtering results indicate that current motion parameters (e.g., M or T used in a current pass of methodologies 500) are acceptable candidate motion parameters for updating the optimal motion parameters used in a previous pass of methodologies 500. For instance, if it is determined that current motion parameters are acceptable update candidates, then one or more motion parameters used in a previous pass through methodologies 500 (or one or more initialized motion parameters) can be updated. On the other hand, if it is determined that current motion parameters are not acceptable update candidates, then the one or more motion parameters used in a previous pass through methodologies 500 (e.g., where M and T were used in a previous pass of methodologies 500, initialized M and T, etc.) can be retained.

According to further non-limiting implementations, methodologies 500 can include determining whether the search for optimal motion parameters meets one or more accomplishment criteria at 506. Based on determining that the search for optimal motion parameters does not meet one or more accomplishment criteria, methodologies 500 can comprise adjusting motion parameter(s) (e.g., initialized motion parameter(s), updated motion parameter(s), previously adjusted motion parameter(s)) at 510 as described below regarding FIGS. 6-8. As further described below regarding FIGS. 6-8, one or more accomplishment criteria can be based on a matching metric as described herein, accomplishment of a predefined search, or other criteria that facilitate judging whether feature-motion decorrelation has been addressed (e.g., compensated in the feature motion analysis). Accordingly, the one or more accomplishment criteria can facilitate judging whether feature-motion decorrelation has been optimally addressed (e.g., best or optimally compensated), or whether feature-motion decorrelation has been addressed to some lesser extent, based on, for example, tradeoffs of compensation quality, speed, and other considerations of a system designer.

As further described below regarding FIGS. 6-8, to determine whether the coupled filtering results meet one or more acceptance criteria at 506, methodologies 500 can further include determining whether a search (e.g., according to a predefined search scheme) has been adequately accomplished. For example, determining whether a search (e.g., according to a predefined search scheme) has been adequately accomplished can include performing the search to exhaustion (e.g., such that all possible sets of motion parameters have been tested against one or more acceptance criteria), or performing the search to some lesser extent (e.g., such that a subset of all possible sets of motion parameters are tested against one or more acceptance criteria), based on, for example, tradeoffs of compensation quality, speed, and other considerations of a system designer. Thus, according to various embodiments, the disclosed subject matter can yield a global optimum set of motion parameters (e.g., via an exhaustive search, etc.), or a local optimum (e.g., via a constrained search, etc.), depending on, for example, different search schemes or further constraints placed on a search for optimal motion parameter(s), among other factors. In addition, methodologies 500 can further comprise outputting updated optimal motion parameter(s) based on determining the coupled filtering results meet one or more accomplishment criteria at 508.

As described above, various aspects of methodologies can be performed by systems, components, devices, and so on, or portions thereof, as described above, for example, regarding FIGS. 1-3. For instance, an ultrasound system 100, a coupled filtering component or device 202, or a component or sub-component thereof, can facilitate the performance of portions of methodologies via, for example, input component 102, control component 104, storage component 108, signal processing component 110, image processing component 112, and so on. In addition, as described below regarding FIGS. 17-18, various aspects of methodologies, systems, components, device, and portions thereof, can be performed by a computer executing software configured to perform the functionality as described herein.

Based on the tissue motion model described above, the following relationship between a scatterer after tissue motion (e.g., in after-motion image information) and its counterpart before tissue motion (e.g., in before-motion image information) can be determined, for example, according to Equation 6.

$$T_n(X; x_n) = a_n \delta(X - (MX_n + T))$$ (Eqn. 6)
$$= \frac{1}{|M|} a_n \delta(M^{-1}(X - T) - X_n)$$
$$= \frac{1}{|M|} T_n(M^{-1}(X - T); X_n)$$

Here |M| denotes the determinant of the matrix M. Note that, as described above, although the use of terms "before" and "after" regarding motion can refer to a situation where there is no absolute motion in the "before-motion" context relative to another frame of reference, various embodiments of the disclosed subject matter are not so limited. For instance, in a continuum of motion for a scatterer of interest, various embodiments described herein are intended to encompass a context where the term "before-motion" can refer to point in time prior to an "after-motion" point in time, even though the scatter can be in continuous motion throughout the relevant time period and relative to another frame of reference (e.g., a fixed frame of reference different from the scatterer before-motion and after-motion frame of reference). In other words, relative to another frame of reference, the terms "before-motion" and "after-motion" can refer to points in time "before" and "after" any particular motion of interest (e.g., translation, rotation, roll, yaw, pitch, shearing, scaling, etc., and any combination thereof, regardless of reference point, axis, or frame).

Alternatively, the above relationship of Equation 6 can be represented, for example, according to Equation 7.

$$T_n(MX + T_i x_n) = \frac{1}{|M|} T_n(X; X_n)$$ (Eqn. 7)

which can be used to derive the analytical relationship in Equation 8.

As describe above, an image warping can be performed in a companding approach to address feature-motion decorrelation, where the image warping is a simplified version of the general affine warping as M is simplified into a diagonal matrix (e.g., as in Equation 10 below). For generality, according to various embodiments, $I(X; x_n)$ can be defined as $I(MX+T; x_n)$ after an image warping.

According to the following derivation, for example, it can be seen in Equation 8, that a companding approach cannot completely compensate for image variation caused by tissue deformation (e.g., $I(MX+T; x_n) \neq I(X; X_n)$).

$$I(MX + T; x_n) = \sum_{n=1}^{N} \int_{R1} T_n(MX + T - X'; x_n) H(X')dX'$$ (Eqn. 8)

$$= \sum_{n=1}^{N} \int_{R1} T_n(M(X - M^{-1}X') + T; x_n) H(X')dX'$$

$$\text{(Using Eqn. 7)} = \sum_{n=1}^{N} \int_{R3} \frac{1}{|M|} T_n(X - M^{-1}X; X_n) H(X')dX'$$

$$= \sum_{n=1}^{N} \int_{R3} T_n(X - M^{-1}X'; X_n) H(M^{-1}X')d(M^{-1}X')$$

$$= \sum_{n=1}^{N} T_n(X; X_n) * H(MX)$$

$$\neq \sum_{n=1}^{N} T_n(X; X_n) * H(X) - I(X; X_n)$$

It can be appreciated that, from Equation 8, the convolution between I (MX+T; $x_n$) and the original PSF H(X) can yield the following relationship, for example, according to Equation 9:

$$I(MX + T; x_n) * H(X) = \sum_{n=1}^{N} T_n(X; X_n) * H(MX) * H(X)$$ (Eqn. 9)

$$= I(X; X_n) * H(MX)$$

Note that, in Equation 9, parameters of the scatterers (e.g., reflectance coefficients, locations, etc.) are not explicitly relied upon, yet Equation 9 comprises motion parameters (e.g., M, a 3×3 matrix describing rotation, shearing, and scaling of the scatterer pattern, and T, denote a 3×1 vector describing 3-D translation). As a result, the relationship described in Equation 9 can be employed to estimate motion parameters for compensation of feature-motion decorrelation. It can be appreciated that various embodiments as described herein can be used for analyzing both 2-D image pairs and 3-D image pairs (e.g., 2-D and 3-D ultrasound image pairs) as long as the filtering results satisfy the relationship of Equation 9. In addition, coupled filtering as described can be applied to 2-D and 3-D image sequence analysis (e.g., 2-D and 3-D ultrasound image sequence analysis) in that coupled filtering can be applied to two neighboring frames in a sequence repeatedly.

Accordingly, as described above, various embodiments of the disclosed subject matter provide methodologies for compensation of feature-motion decorrelation and/or coupled filtering. For example, FIG. 6 depicts further aspects of methodologies 600 for compensation of feature-motion decorrelation accordingly as described herein. For instance, methodologies 600 can include receiving before-motion and after-motion image information of an object at 602 and 604, respectively. For example, an ultrasound system 100, a coupled filtering component or device 202, or a component or subcomponent thereof, can facilitate receiving before-motion and after-motion image information of an object at 602 and 604 via, for example, input component 102, control component 104, storage component 108, signal processing component 110, image processing component 112, and so on.

As described above, relative to another frame of reference, the terms "before-motion" and "after-motion" can refer to points in time "before" and "after" any particular motion of interest (e.g., translation, rotation, shearing, scaling, etc., and any combination thereof, regardless of reference point, axis, or frame) of an object. For instance, at 602, information associated with a first image (e.g., before-motion image information, $I_1(X; X_n)$, etc.) can be received, for example, in an ultrasound system 100, a coupled filtering component or device 202, or a component or subcomponent thereof. Similarly, at 604, information associated with a second image (e.g., after-motion image information, $I_2(X; x_n)$, etc.) can be received.

At 606, methodologies 600 can further include initializing motion parameter(s) (e.g., M, a 3×3 matrix describing rotation, shearing, and scaling of the scatterer pattern, and T, denoting a 3×1 vector describing 3-D translation, etc.) to be used in coupled filtering as described herein. For example, an ultrasound system 100, a coupled filtering component or device 202, or a component or subcomponent thereof, can facilitate initializing motion parameter(s) via, for example, input component 102, control component 104, storage component 108, signal processing component 110, image processing component 112, and so on.

Methodologies 600 can further include warping 608 after-motion image information received at 604 (e.g., $I_2(X; x_n)$) to create warped after-motion image information (e.g., $I_2(MX+T; x_n)$). For instance, as described below regarding FIG. 7, a specific motion model can be used to warp 608 after-motion image information received at 604. For example, as further described below, various embodiments of methodologies 600 can employ a local affine motion model to warp 608 after-motion image information received at 604 (e.g., $I_2(X; x_n)$) to create warped after-motion image information (e.g., $I_2(MX+T; x_n)$). As a further example, an ultrasound system 100, a coupled filtering component or device 202, or a component or subcomponent thereof, can facilitate warping at 608 the after-motion image information received at 604 via, for example, control component 104, signal processing component 110, image processing component 112, and so on.

In a further non-limiting aspect of methodologies 600, at 610, a filter (e.g., a specific band-pass filter, etc.) can be used to filter before-motion image information received at 602 (e.g., $I_1(X; X_n)$). As a non-limiting example, before-motion image information received at 602 can be filtered at 610 by a convolution of before-motion image information received at 602 (e.g., $I_1(X; X_n)$) with a modified PSF (e.g., H(MX)) to achieve a filtered result (e.g., $I_1(X; X_n)*H(MX)$) of the before-motion image information received at 602. As a further example, at 610, an affine modified Gaussian-weighted cosine filter can be used to filter before-motion image information received at 602 (e.g., $I_1(X; X_n)$), according to the disclosed subject matter, to achieve a filtered result of the before-motion image information received at 602. In yet another example, an ultrasound system 100, a coupled filtering component or device 202, or a component or subcomponent thereof, can facilitate filtering before-motion image information received at 602 via, for example, control component 104, signal processing component 110, image processing component 112, and so on.

Similarly, at 612, exemplary methodologies 600 can include filtering warped after-motion image information (e.g., $I_2(MX+T; x_n)$). As an example, warped after-motion image information (received at 604) can be filtered at 612 by a convolution of the warped after-motion image information (e.g., $I_2(MX+T; x_n)$) with an original PSF (e.g., H(X)), to achieve a filtered result (e.g., $I_2(MX+T; x_n)*H(X)$) of the warped after-motion image. In a further non-limiting example, at 612, a Gaussian-weighted cosine filter can be used to filter warped after-motion image information (e.g., $I_2(MX+T; x_n)$), according to the disclosed subject matter, to achieve a filtered result of the warped after-motion image information. As described above, an ultrasound system 100, a coupled filtering component or device 202, or a component or subcomponent thereof, can facilitate filtering warped after-motion image information via, for example, control component 104, signal processing component 110, image processing component 112, and so on.

Note that, according to various non-limiting aspects of the disclosed subject matter, the affine modification of Gaussian-weighted cosine filter in 610 and the affine motion model employed in 608 advantageously share the same set, or substantially the same set, of affine motion parameter(s). Note further that filtering at 610 and 612, according to various non-limiting embodiments, can be employed as described herein to generate coupled filtering results (e.g., $I_1(X; X_n)*H(MX)$ and $I_2(MX+T; x_n)*H(X)$).

Certain aspects of the disclosed subject matter are described or depicted herein for the purposes of illustration and, as such, the disclosed subject matter should not be so limited. For example, while the affine modification of Gaussian-weighted cosine filter in 610 and the affine motion model employed in 608 are depicted as illustrative embodiments, the disclosed subject matter is not so limited. However, it can be apparent to one skilled in the art that, upon review of the disclosed subject matter, other modifications, filters, and motions models can be employed, for example, regarding the warping 608 and filtering 610 and 612. Thus, variations of the disclosed embodiments as suggested by the disclosed apparatuses, systems and methodologies are intended to be encompassed within the scope of the subject matter disclosed herein.

Methodologies 600 can further include updating optimal motion parameter(s) (e.g., an optimal M, a 3×3 matrix describing rotation, shearing, and scaling of the scatterer pattern, and/or an optimal T, denoting a 3×1 vector describing 3-D translation, etc.) at 614. For example, at 614, various non-limiting embodiments can employ the relationship of the coupled filtering results (e.g., $I_1(X; X_n)*H(MX)$ and $I_2(MX+T; x_n)*H(X)$) to search for optimal motion parameter(s). As a further example, for a set combinations of M and T, such that Equation 9 is satisfied, or most closely satisfied, for the coupled filtering results (e.g., $I_1(X; x_n)*H(MX)$ and $I_2(MX+T; x_n)*H(X)$), a particular combination can exist that can result in optimal compensation of feature-motion decorrelation. As a result, a particular combination of M and T can result in a closest match between the coupled filtering results. In yet other non-limiting examples, an ultrasound system 100, a coupled filtering component or device 202, or a component or subcomponent thereof, can facilitate updating optimal motion parameter(s) via, for example, control component 104, signal processing component 110, image processing component 112, and so on.

Thus, in various non-limiting implementations, methodologies 600 can further include updating optimal motion parameter(s), at 614, based in part on the coupled filtering results. As a further example, updating optimal motion parameter(s) can include updating optimal motion parameter(s) at 614 based in part on a closest match between the coupled filtering results. Note that, as further described below regarding FIGS. 7-8, a closest match can yield a global optimum set of motion parameters (e.g., via an exhaustive search, etc.), or a local optimum (e.g., via a constrained search, etc.), depending on, for example, different search schemes or further constraints placed on a search for optimal motion parameter(s), among other factors.

As described below regarding FIGS. 7-8, at 614, methodologies 600 can include determining whether coupled filtering results indicate that current motion parameters (e.g., M or T used in a current pass of methodologies 600) are acceptable candidate motion parameters for updating the motion parameters used in a previous pass of methodologies 600. For example, if it is determined that current motion parameters are acceptable update candidates, then one or more motion parameters used in a previous pass through methodologies 600 (or one or more initialized motion parameters) can be updated. As a further example, if it is determined that current motion parameters are not acceptable update candidates, then the one or more motion parameters used in a previous pass through methodologies 600 (e.g., where M and T were used in a previous pass of methodologies 600, initialized M and T, etc.) can be retained.

In addition, methodologies 600 can further include determining whether the search for optimal motion parameters meets the one or more accomplishment criteria at 616. For example, as further described below regarding FIGS. 7-8, in a search for optimal motion parameter(s) that yield a closest match between the coupled filtering results (e.g., a global optimum or a local optimum), a measure or metric of how closely the coupled filtering results match (e.g., a matching metric) can be employed. For instance, in exemplary non-limiting embodiments described herein, a matching metric in the form of correlation coefficients between the coupled filtering results can be determined.

As a further example, the matching metric can be compared at 616 to one or more accomplishment criteria to facilitate determining whether search for optimal motion parameters is accomplished (e.g., whether the matching metric exceeds a predetermined threshold, otherwise demonstrates that the search for optimal motion parameters meets the one or more accomplishment criteria, whether the matching metric indicates that the coupled filtering results yields the best among previous coupled filtering results, whether the matching metric indicates that one or more motion parameters should be further adjusted as described below, etc.). In addition, this determination can be used to determine whether to continue searching for optimal motion parameter(s) as described below at 620. In yet other non-limiting examples, an ultrasound system 100, a coupled filtering component or device 202, or a component or subcomponent thereof, can facilitate determining whether the coupled filtering results meet one or more acceptance criteria at 616 via, for example, control component 104, signal processing component 110, image processing component 112, and so on.

It should be appreciated by one skilled in the art, upon review of the disclosed subject matter, that matching metrics other than correlation coefficients can be employed without departing from the scope of the disclosed subject matter. For instance, further non-limiting implementations can employ other matching metrics (e.g., sum of squared distance (SSD) or the sum of absolute distance (SAD), etc.).

As a further example, to determine whether the search for optimal motion parameters meets the one or more accomplishment criteria, methodologies 600 can further include at 616, determining whether a search (e.g., according to a predefined search scheme) has been adequately accomplished. For instance, an exemplary predefined search can include enumerating sets of possible motion parameters (e.g., according to a multi-scale framework or otherwise), enumerating sets of possible motion parameters under additional constraints (e.g., a tissue incompressibility constraint, etc.), deciding candidate sets of motion parameters under the guide of appropriate heuristics (e.g., gradient based methods, greedy methods, etc.) for testing coupled filtered results against one or more acceptance criteria at 614.

As yet another example, determining whether a search (e.g., according to a predefined search scheme) has been adequately accomplished can include performing the search to exhaustion (e.g., such that all possible sets of motion parameters have been tested against one or more acceptance criteria), or performing the search to some lesser extent (e.g., such that a subset of all possible sets of motion parameters are tested against one or more acceptance criteria), based on, for example, tradeoffs of compensation quality, speed, and other considerations of a system designer. Thus, according to various embodiments, the disclosed subject matter can yield a global optimum set of motion parameters (e.g., via an exhaustive search, etc.), or a local optimum (e.g., via a constrained search, etc.), depending on, for example, different search schemes or further constraints placed on a search for optimal motion parameter(s), among other factors.

If it is determined at 616 that the search for optimal motion parameters meets the one or more accomplishment criteria (e.g., a search scheme is adequately accomplished), in further non-limiting implementations, methodologies 600 can include outputting optimal motion parameter(s) at 618. For instance, based on, for example, initialized motion parameter(s), feature-motion decorrelation present in the object image information, performance level determined by one or more acceptance criteria, optimal motion parameter(s) output at 618 can be global optimum motion parameter(s), local optimum motion parameter(s), the initialized optimal motion parameter(s) at 606, updated optimal motion parameter(s) (e.g., based in part on one or more search constraint(s), one or more acceptance criteria, etc. applied via, for example, input component 102, hard coded or software applied by the equipment manufacturer or otherwise), etc. In exemplary non-limiting implementations, an ultrasound system 100, a coupled filtering component or device 202, or a component or subcomponent thereof, can facilitate outputting the optimal motion parameter(s) at 618 via, for example, control component 104, signal processing component 110, image processing component 112, and so on.

If it is determined at 616 that the search for optimal motion parameters does not meet the one or more accomplishment criteria (e.g., currently enumerated sets of possible motion parameters in a search scheme has not yet adequately compensated the feature-motion decorrelation), in further non-limiting implementations, methodologies 600 can further include adjusting motion parameter(s) at 620. For instance, for various reasons, it is possible that initialized motion parameter(s), in a first pass of coupled filtering 600, can produce less than a global optimum set of motion parameter(s), a local optimum set of motion parameter(s), or fail to otherwise achieve an adequate compensation of feature-motion decorrelation, etc. Thus, various embodiments of the disclosed subject matter can provide adjusted motion parameter(s) at 620 into methodologies 600. Accordingly, additional iterations of methodologies 600 can use adjusted motion parameter(s) to refine the compensation for feature-motion decorrelation. In various embodiments, an ultrasound system 100, a coupled filtering component or device 202, or a component or subcomponent thereof, can facilitate adjusting motion parameter(s) at 620 via, for example, control component 104, signal processing component 110, image processing component 112, and so on.

Figure 7:
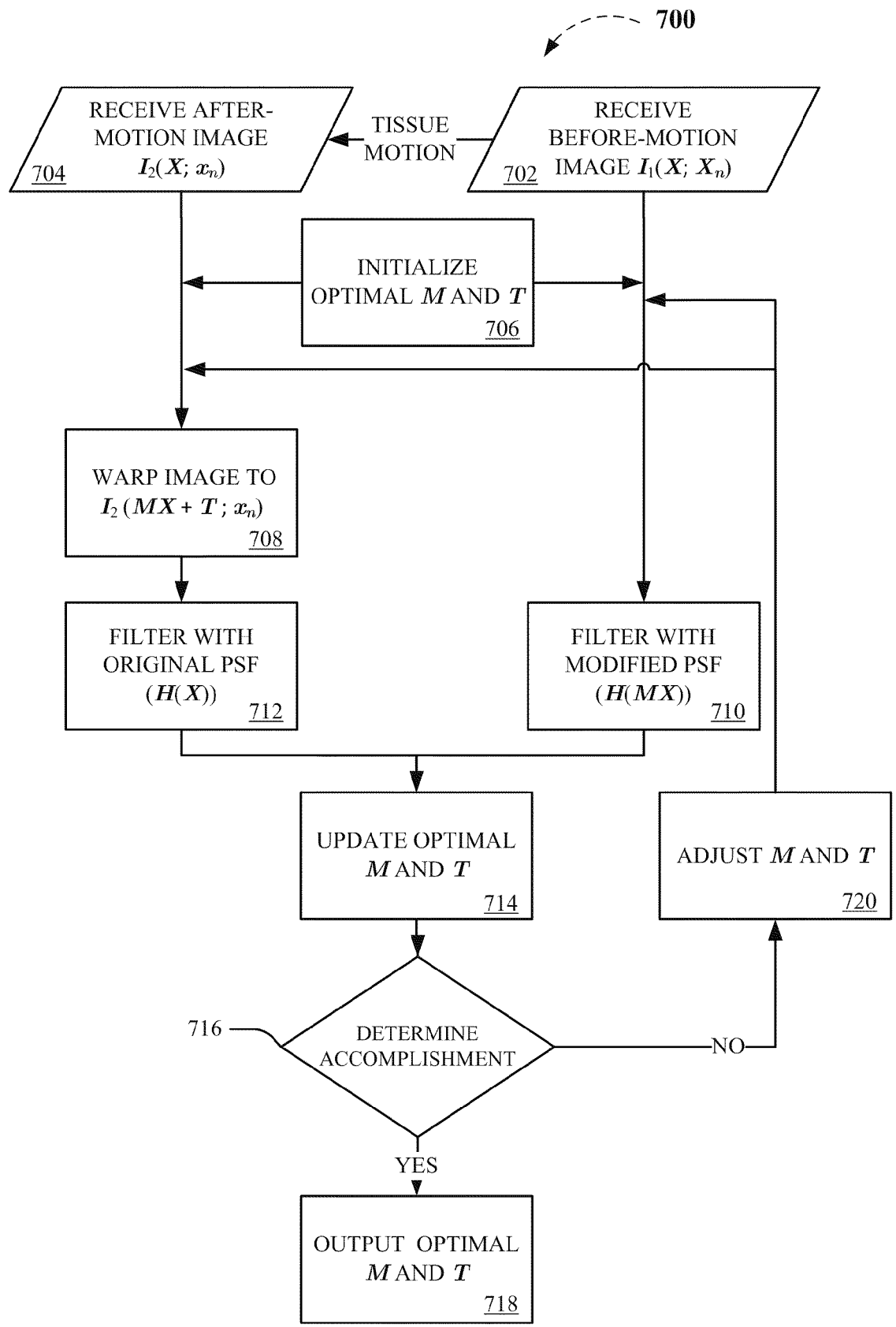
FIG. 7 depicts further non-limiting methodologies for compensation of feature-motion decorrelation according aspects of the disclosed subject matter.

FIG. 7 depicts further non-limiting methodologies for feature-motion decorrelation according aspects of the disclosed subject matter. For instance, methodologies 700 can include receiving ultrasound before-motion and after-motion image information associated with tissue at 702 and 704, respectively. As an example, an ultrasound system 100, a coupled filtering component or device 202, or a component or subcomponent thereof, can facilitate receiving before-motion and after-motion image information at 702 and 704 via, for example, input component 102, control component 104, storage component 108, signal processing component 110, image processing component 112, and so on. For instance, at 702, information associated with a first image (e.g., before-motion image information, $I_1(X; X_n)$, etc.) can be received, for example, in an ultrasound system 100, a coupled filtering component or device 202, or a component or subcomponent thereof. Similarly, at 704, information associated with a second image (e.g., after-motion image information, $I_2(X; x_n)$, etc.) can be received.

At 706, methodologies 700 can further include initializing motion parameter(s) (e.g., an optimal M and T, or a reasonable estimate thereof based on, for example, prior knowledge of similar systems, target objects, etc.) to be used in coupled filtering as described. As an example, an ultrasound system 100, a coupled filtering component or device 202, or a component or subcomponent thereof, can facilitate initializing motion parameter(s) via, for example, input component 102, control component 104, storage component 108, signal processing component 110, image processing component 112, and so on.

Methodologies 700 can further include warping 708 after-motion image information received at 704 (e.g., $I_2(X; x_n)$) to achieve a warped image (e.g., $I_2(MX+T; x_n)$). For instance, as described above regarding FIG. 6, a specific motion model can be used to warp 708 after-motion image information received at 704. For example, as described, various embodiments of methodologies 700 can employ a local affine motion model to warp 708 after-motion image information received at 704 (e.g., $I_2(X; x_n)$) to create warped after-motion image information (e.g., $I_2(MX+T; x_n)$). In various implementations, an ultrasound system 100, a coupled filtering component or device 202, or a component or subcomponent thereof, can facilitate warping 708 after-motion image information received at 704 via, for example, control component 104, signal processing component 110, image processing component 112, and so on.

In yet another non-limiting aspect of methodologies 700, at 710, a filter (e.g., a specific band-pass filter, etc.) can be used to filter before-motion image information received at 702 (e.g., $I_1(X; X_n)$). In an example, before-motion image information received at 702 can be filtered at 710 by a convolution of before-motion image information received at 702 (e.g., $I_1(X; X_n)$) with a modified PSF (e.g., H(MX)) to achieve a filtered result (e.g., $I_1(X; X_n)$*H(MX)) of the before-motion image information received at 702. As another example, at 710, an affine modified Gaussian-weighted cosine filter can be used to filter before-motion image information received at 702 (e.g., $I_1(X; X_n)$), according to the disclosed subject matter, to achieve a filtered result of the before-motion image information received at 702. In yet another example, an ultrasound system 100, a coupled filtering component or device 202, or a component or subcomponent thereof, can facilitate filtering before-motion image information received at 702 via, for example, control component 104, signal processing component 110, image processing component 112, and so on.

In a similar manner, at 712, exemplary methodologies 700 can include filtering warped after-motion image information (e.g., $I_2(MX+T; x_n)$). As an example, warped after-motion image information (received at 704) can be filtered at 712 by a convolution of the warped after-motion image information (e.g., $I_2(MX+T; x_n)$) with an original PSF (e.g., H(X)), to achieve a filtered result (e.g., $I_2(MX+T; x_n)$*H(X)) of the warped after-motion image information. In a further non-limiting example, at 712, a Gaussian-weighted cosine filter can be used to filter warped after-motion image information (e.g., $I_2(MX+T; x_n)$), according to the disclosed subject matter, to achieve a filtered result of the warped after-motion image information. As described above, an ultrasound system 100, a coupled filtering component or device 202, or a component or subcomponent thereof, can facilitate filtering warped after-motion image information via, for example, control component 104, signal processing component 110, image processing component 112, and so on.

Note that, according to various non-limiting aspects of the disclosed subject matter, the affine modification of Gaussian-weighted cosine filter in 710 and the affine motion model employed in 708 advantageously share the same set, or substantially the same set, of affine motion parameters. In addition, note that the filtering at 710 and 712, according to various non-limiting embodiments, can be employed as described herein to generate coupled filtering results (e.g., $I_n(X; X_n)$*H(MX) and $I_2(MX+T; x_n)$*H(X)).

As mentioned, certain aspects of the disclosed subject matter are described or depicted herein for the purposes of illustration, and as such, the disclosed subject matter should not be so limited. For example, while the affine modification of Gaussian-weighted cosine filter in 710 and the affine motion model employed in 708 are depicted as illustrative embodiments, the disclosed subject matter is not so limited. Thus, it can be apparent to one skilled in the art that, upon review of the disclosed subject matter, other modifications, filters, and motions models can be employed, for example, regarding the warping 708 and filtering 710 and 712. Accordingly, variations of the disclosed embodiments as suggested by the disclosed apparatuses, systems and methodologies are intended to be encompassed within the scope of the subject matter disclosed herein.

For instance, while affine warping is described herein in the context of illustrative embodiments, the disclosed subject matter is not so limited. As a result, one skilled in the art, upon review of the disclosed subject matter, can recognize that other possibilities of image warping and filter modification are possible for use with embodiments described herein. Accordingly, modifications to the disclosed embodiments that include alternatives to affine warping are intended be included in the scope of such embodiments subject where such filter modifications share the same, or a substantially similar, set of motion parameter(s) with the specific motion model employed.

Methodologies 700 can further include updating optimal motion parameter(s) at 714. For example, at 714, various non-limiting embodiments can employ the relationship of the coupled filtering results (e.g., $I_1(X; X_n)$*H(MX) and $I_2(MX+T; x_n)$*H(X)) to search for optimal motion parameter(s) as described above in reference to FIG. 6.

As a further example, for a set combinations of M and T, such that Equation 9 is satisfied, or most closely satisfied, for the coupled filtering results (e.g., $I_1(X; X_n)$*H(MX) and $I_2(MX+T; x_n)$*H(X)), a particular combination motion parameter(s) can exist that can result in optimal compensation of feature-motion decorrelation. Accordingly, this particular combination of motion parameter(s) can result in a closest match between the coupled filtering results. In yet other non-limiting examples, an ultrasound system 100, a coupled filtering component or device 202, or a component or subcomponent thereof, can facilitate updating optimal motion parameter(s) via, for example, control component 104, signal processing component 110, image processing component 112, and so on.

Thus, in various non-limiting implementations, methodologies 700 can further include updating optimal motion parameter(s), at 714, based in part on the coupled filtering results. In an illustrative example, updating optimal motion parameter(s) can include updating optimal motion parameter(s) at 714 based in part on a closest match between the coupled filtering results. Note that, as further described regarding FIGS. 6 and 8, a closest match can yield a global optimum set of motion parameters (e.g., via an exhaustive search, etc.) or a local optimum (e.g., via a constrained search, etc.), depending on, for example, different search schemes or further constraints place on a search for optimal motion parameter(s), among other factors.

In various embodiments, at 714, methodologies 700 can include determining whether coupled filtering results indicate that current motion parameters (e.g., M or T used in a current pass of methodologies 700) are acceptable candidate motion parameters for updating the optimal motion parameters used in a previous pass of methodologies 700, as described below regarding FIG. 8. For example, if it is determined that current motion parameters are acceptable update candidates, then one or more optimal motion parameters used in a previous pass through methodologies 700 (or one or more initialized motion parameters) can be updated. As a further described below, if it is determined that current motion parameters are not acceptable update candidates, then the one or more optimal motion parameters used in a previous pass through methodologies 700 (e.g., where M and T were used in a previous pass of methodologies 700, initialized M and T, etc.) can be retained.

In addition, in various embodiments of the disclosed subject matter, additional constraints can be placed on a search for optimal motion parameter(s) (e.g., using a tissue incompressibility constraint, limiting a motion parameter search space, enforcing a preference for a local optimum, using one or more accomplishment criteria that facilitates closest match determination, a time threshold or computation threshold, such as time limit or limit on number of processing cycles, etc.). Accordingly, it should be appreciated that use of constraints in various embodiments of the disclosed subject matter can influence desired tradeoffs between computational complexity, speed, time, cost, and performance of coupled filtering systems that employ compensation of feature-motion decorrelation. For example, as described in FIGS. 11-16 below, using a mean correlation coefficient accomplishment criterion of approximately 0.95 in the face of tissue deformation of 10% can provide improved compensation of feature-motion decorrelation over conventional solutions, while potentially saving processing cycles or delivering faster results.

In addition, methodologies 700 can further include determining whether the search for optimal motion parameters meets the one or more accomplishment criteria at 716. For example, as further described below regarding FIGS. 8, 11, and 17, in a search for optimal motion parameter(s) that yield a closest match between the coupled filtering results (e.g., a global optimum or a local optimum) a metric (e.g., a matching metric) of how closely the coupled filtering results match can be employed. For instance, in exemplary non-limiting embodiments described herein, a matching metric in the form of correlation coefficients between the coupled filtering results can be determined.

As a further example, the matching metric can be compared at 716 to one or more accomplishment criteria to facilitate determining whether the search for optimal motion parameters is accomplished (e.g., whether the matching metric exceeds a predetermined threshold, otherwise demonstrates that the search for optimal motion parameters meets the one or more accomplishment criteria, whether the matching metric indicates that the coupled filtering results yields the best among previous coupled filtering results, whether the matching metric indicates that one or more motion parameters should be further adjusted as described below, etc.). As described, this determination, in turn, can be used to determine whether to continue searching for optimal motion parameter(s) as described below at 720. In yet other non-limiting examples, an ultrasound system 100, a coupled filtering component or device 202, or a component or subcomponent thereof, can facilitate determining whether the search for optimal motion parameters meets the one or more accomplishment criteria at 716 via, for example, control component 104, signal processing component 110, image processing component 112, and so on. It should be appreciated by one skilled in the art, upon review of the disclosed subject matter, that matching metrics other than correlation coefficients can be employed without departing from the scope of the disclosed subject matter. For instance, further non-limiting implementations can employ other matching metrics such as SSD, SAD, etc.

In addition, to determine whether the search for optimal motion parameters meets the one or more accomplishment criteria, methodologies 700 can further include at 716, determining whether a search (e.g., according to a predefined search scheme) has been adequately accomplished. As an example, exemplary predefined searches can include enumerating sets of possible motion parameters (e.g., according to a multi-scale framework or otherwise), enumerating sets of possible motion parameters under additional constraints (e.g., a tissue incompressibility constraint, etc.), deciding candidate sets of motion parameters under the guide of appropriate heuristics (e.g., gradient based methods, greedy methods, etc.) for testing coupled filtered results against one or more acceptance criteria at 714.

As yet another example, determining whether a search (e.g., according to a predefined search scheme) has been adequately accomplished, can include performing the search to exhaustion (e.g., such that all possible sets of motion parameters have been tested against one or more acceptance criteria), or performing the search to some lesser extent (e.g., such that a subset of all possible sets of motion parameters are tested against one or more acceptance criteria), based on, for example, tradeoffs of compensation quality, speed, and other considerations of a system designer. Thus, according to various embodiments, the disclosed subject matter can yield a global optimum set of motion parameters (e.g., via an exhaustive search, etc.), or a local optimum (e.g., via a constrained search, etc.), depending on, for example, different search schemes or further constraints placed on a search for optimal motion parameter(s), among other factors.

If it is determined at 716 that the search for optimal motion parameters meets the one or more accomplishment criteria (e.g., a search scheme is adequately accomplished), in further non-limiting implementations, methodologies 700 can include outputting the optimal motion parameter(s) at 718. For instance, based on, for example, initialized motion parameter(s), feature-motion decorrelation present in the tissue, performance level determined by one or more acceptance criteria, optimal motion parameter(s) output at 718 can be global optimum motion parameter(s), local optimum motion parameter(s), initialized optimal motion parameter(s) at 706, updated optimal motion parameter(s) (e.g., based in part on a search constraint, one or more acceptance criteria, etc. applied via, for example, input component 102, hard coded or software applied by the equipment manufacturer or otherwise), etc. In exemplary non-limiting implementations, an ultrasound system 100, a coupled filtering component or device 202, or a component or subcomponent thereof, can facilitate outputting the optimal motion parameter(s) at 718 via, for example, control component 104, signal processing component 110, image processing component 112, and so on.

If it is determined at 716 that the search for optimal motion parameters does not meet the one or more accomplishment criteria (e.g., currently enumerated sets of possible motion parameters in a search scheme has not yet adequately compensated the feature-motion decorrelation), in further non-limiting implementations, methodologies 700 can further include adjusting motion parameter(s) at 720. As an example, for various reasons, it is possible that initialized motion parameter(s), in a first pass of coupled filtering, can produce less than a global optimum set of motion parameter(s), local optimum motion set of parameter(s), etc., or fail to otherwise achieve adequate compensation of feature-motion decorrelation. Thus, various embodiments of the disclosed subject matter can provide adjusted motion parameter(s) at 720 into methodologies 700. As a result, additional iterations of methodologies 700 can use adjusted motion parameter(s) to refine the compensation for feature-motion decorrelation. In various embodiments, an ultrasound system 100, a coupled filtering component or device 202, or a component or subcomponent thereof, can facilitate adjusting motion parameter(s) at 720 via, for example, control component 104, signal processing component 110, image processing component 112, and so on.

Figure 8:
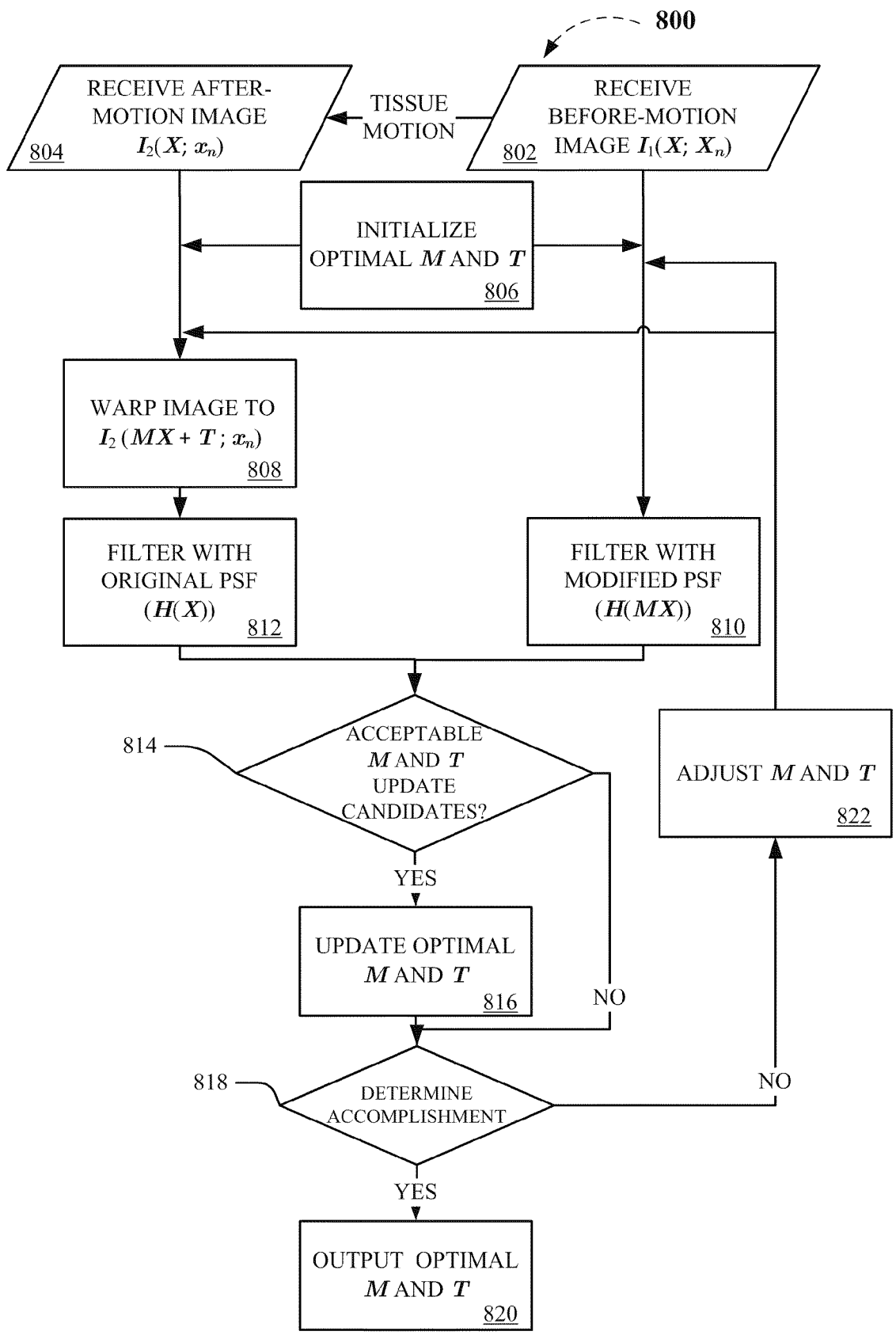
FIG. 8 depicts other non-limiting methodologies for compensation of feature-motion decorrelation according to further aspects as described herein.

FIG. 8 depicts other non-limiting methodologies 800 for compensation of feature-motion decorrelation according to further aspects as described herein. For instance, methodologies 800 can include receiving ultrasound before-motion and after-motion image information associated with tissue at 802 and 804, respectively. As an example, an ultrasound system 100, a coupled filtering component or device 202, or a component or subcomponent thereof, can facilitate receiving before-motion and after-motion image information at 802 and 804 via, for example, input component 102, control component 104, storage component 108, signal processing component 110, image processing component 112, and so on. For instance, at 802, information associated with a first image (e.g., before-motion image information, $I_1(X; X_n)$, etc.) can be received, for example, in an ultrasound system 100, a coupled filtering component or device 202, or a component or subcomponent thereof. Similarly, at 804, information associated with a second image (e.g., after-motion image information, $I_2(X; x_n)$, etc.) can be received.

At 806, methodologies 800 can further include initializing motion parameter(s) (e.g., an optimal M and T, or a reasonable estimate thereof based on, for example, prior knowledge of similar systems, target objects, etc.) to be used in coupled filtering as described. As an example, an ultrasound system 100, a coupled filtering component or device 202, or a component or subcomponent thereof, can facilitate initializing motion parameter(s) via, for example, input component 102, control component 104, storage component 108, signal processing component 110, image processing component 112, and so on.

Methodologies 800 can further include warping 808 after-motion image information received at 804 (e.g., $I_2(X; x_n)$) to achieve a warped image (e.g., $I_2(MX+T; x_n)$). For instance, as described above regarding FIG. 6, a specific motion model can be used to warp 808 after-motion image information received at 804. For example, as described, various embodiments of methodologies 800 can employ a local affine motion model to warp 808 after-motion image information received at 804 (e.g., $I_2(X; x_n)$) to create warped after-motion image information (e.g., $I_2(MX+T; x_n)$). In various implementations, an ultrasound system 100, a coupled filtering component or device 202, or a component or subcomponent thereof, can facilitate warping 808 after-motion image information received at 804 via, for example, control component 104, signal processing component 110, image processing component 112, and so on.

In yet another non-limiting aspect of methodologies 800, at 810, a filter (e.g., a specific band-pass filter, etc.) can be used to filter before-motion image information received at 802 (e.g., $I_1(X; X_n)$). In an example, before-motion image information received at 802 can be filtered at 810 by a convolution of before-motion image information received at 802 (e.g., $I_1(X; X_n)$) with a modified PSF (e.g., H(MX)) to achieve a filtered result (e.g., $I_1(X; X_n)*H(MX)$) of the before-motion image information received at 802. As another example, at 810, an affine modified Gaussian-weighted cosine filter can be used to filter before-motion image information received at 802 (e.g., $I_1(X; X_n)$), according to the disclosed subject matter, to achieve a filtered result of the before-motion image information received at 802. In yet another example, an ultrasound system 100, a coupled filtering component or device 202, or a component or subcomponent thereof, can facilitate filtering before-motion image information received at 802 via, for example, control component 104, signal processing component 110, image processing component 112, and so on.

In a similar manner, at 812, exemplary methodologies 800 can include filtering warped after-motion image information (e.g., $I_2(MX+T; x_n)$). As an example, warped after-motion image information (received at 804) can be filtered at 812 by a convolution of the warped after-motion image information (e.g., $I_2(MX+T; x_n)$) with an original PSF (e.g., H(X)), to achieve a filtered result (e.g., $I_2(MX+T; x_n)*H(X)$) of the warped after-motion image information. In a further non-limiting example, at 812, a Gaussian-weighted cosine filter can be used to filter warped after-motion image information (e.g., $I_2(MX+T; x_n)$), according to the disclosed subject matter, to achieve a filtered result of the warped after-motion image information. As described above, an ultrasound system 100, a coupled filtering component or device 202, or a component or subcomponent thereof, can facilitate filtering warped after-motion image information via, for example, control component 104, signal processing component 110, image processing component 112, and so on.

Note that, according to various non-limiting aspects of the disclosed subject matter, the affine modification of Gaussian-weighted cosine filter in 810 and the affine motion model employed in 808 advantageously share the same set, or substantially the same set, of affine motion parameters. In addition, note that the filtering at 810 and 812, according to various non-limiting embodiments, can be employed as described herein to generate coupled filtering results (e.g., $I_1(X; X_n)*H(MX)$ and $I_2(MX+T; x_n)*H(X)$).

As mentioned, certain aspects of the disclosed subject matter are described or depicted herein for the purposes of illustration, and as such, the disclosed subject matter should not be so limited. For example, while the affine modification of Gaussian-weighted cosine filter in 810 and the affine motion model employed in 808 are depicted as illustrative embodiments, the disclosed subject matter is not so limited. Thus, it can be apparent to one skilled in the art that, upon review of the disclosed subject matter, other modifications, filters, and motions models can be employed, for example, regarding the warping 808 and filtering 810 and 812. Accordingly, variations of the disclosed embodiments as suggested by the disclosed apparatuses, systems and methodologies are intended to be encompassed within the scope of the subject matter disclosed herein.

For instance, while affine warping is described herein in the context of illustrative embodiments, the disclosed subject matter is not so limited. As a result, one skilled in the art, upon review of the disclosed subject matter, can recognize that other possibilities of image warping and filter modification are possible for use with embodiments described herein. Accordingly, modifications to the disclosed embodiments that include alternatives to affine warping are intended be included in the scope of such embodiments subject where such filter modifications share the same, or a substantially similar, set of motion parameter(s) with the specific motion model employed.

In addition, at 814, methodologies 800 can include determining whether coupled filtering results indicate that current motion parameters (e.g., M or T used in a current pass of methodologies 800) are acceptable candidate motion parameters (e.g., acceptable M or T update candidates) for updating at 816 the optimal motion parameters used in a previous pass of methodologies 800. For example, as further described herein, methodologies 800 can include computing a matching metric between coupled filtering results and comparing with a matching metric using optimal motion parameters in a previous pass through methodologies 800 (e.g., where M and T were used in a previous pass of methodologies 800, initialized optimal M and T, etc.) to determine whether one or more current motion parameters are acceptable candidate motion parameter. As further described, computing matching metrics can include calculating correlation coefficients, sum of squared distance, or the sum of absolute distance between the coupled filtering results.

If it is determined at 814 that current motion parameters (e.g., M or T used in a current pass of methodologies 800) are acceptable update candidates, then one or more optimal motion parameters used in a previous pass through methodologies 800 (e.g., where M and T were used in a previous pass of methodologies 800, initialized optimal M and T, etc.) can be updated at 816, as described below. If it is determined at 814 that current motion parameters (e.g., M or T used in a current pass of methodologies 800) are not acceptable update candidates, then the one or more optimal motion parameters used in a previous pass through methodologies 800 (e.g., where M and T were used in a previous pass of methodologies 800, initialized optimal M and T, etc.) can be retained. For example, a matching metric from a current pass of methodologies 800 that exceeds a matching metric from a previous pass could indicate that the current motion parameters are acceptable update candidates.

In further non-limiting implementations, methodologies 800 can include updating optimal motion parameter(s) at 816. For example, at 816, various non-limiting embodiments can employ the relationship of the coupled filtering results (e.g., $I_1(X; X_n)*H(MX)$ and $I_2(MX+T; x_n)*H(X)$) to search for optimal motion parameter(s) as described above in reference to FIG. 7. As a further example, for a set combinations of M and T, such that Equation 9 is satisfied, or most closely satisfied, for the coupled filtering results (e.g., $I_1(X; X_n)*H(MX)$ and $I_2(MX+T; x_n)*H(X)$), a particular combination motion parameter(s) can exist that can result in a desired level of compensation of feature-motion decorrelation (e.g., optimal compensation, less than optimal compensation based on design constraints, etc.). Accordingly, this particular combination of motion parameter(s) can result in a closest match between the coupled filtering results. In yet other non-limiting examples, an ultrasound system 100, a coupled filtering component or device 202, or a component or subcomponent thereof, can facilitate updating optimal motion parameter(s) via, for example, control component 104, signal processing component 110, image processing component 112, and so on.

Thus, in various non-limiting implementations, methodologies 800 can further include updating optimal motion parameter(s), at 816, based in part on the coupled filtering results. In an example, updating optimal motion parameter(s) can include updating optimal motion parameter(s) at 816 based in part on a closest match between the coupled filtering results. Note that, as further described regarding FIGS. 6 and 8, a closest match can yield a global optimum set of motion parameters (e.g., via an exhaustive search, etc.) or a local optimum (e.g., via a constrained search, etc.), depending on, for example, different search schemes or further constraints place on a search for optimal motion parameter(s), among other factors.

As described above, various embodiments of the disclosed subject matter can use additional constraints on a search for optimal motion parameter(s) (e.g., using a tissue incompressibility constraint, limiting a motion parameter search space, enforcing a preference for a local optimum, using one or more acceptance criteria that facilitates closest match determination, a time threshold or computation threshold, such as time limit or limit on number of processing cycles, etc.). Accordingly, it should be appreciated that use of constraints in various embodiments of the disclosed subject matter can influence desired tradeoffs between computational complexity, speed, time, cost, and performance of coupled filtering systems that employ compensation of feature-motion decorrelation.

In addition, methodologies 800 can further include determining the search for optimal motion parameters meets the one or more accomplishment criteria at 818. For example, as further described regarding FIGS. 7, 11, and 17, in a search for optimal motion parameter(s) that yield a closest match between the coupled filtering results (e.g., a global optimum or a local optimum) a metric (e.g., a matching metric) of how closely the coupled filtering results match can be employed. For instance, in exemplary non-limiting embodiments described herein, a matching metric in the form of correlation coefficients between the coupled filtering results can be determined.

As a further example, the matching metric can be compared at 818 to one or more accomplishment criteria to facilitate determining whether the search for optimal motion parameters is accomplished (e.g., whether the matching metric exceeds a predetermined threshold, otherwise demonstrates that the search for optimal motion parameters meets the one or more accomplishment criteria, whether the matching metric indicates that the coupled filtering results yields the best among previous coupled filtering results, whether the matching metric indicates that one or more motion parameters should be further adjusted as described below, etc.). As described, this determination can, in turn, be used to determine whether to continue searching for optimal motion parameter(s) as described below at 822. In yet other non-limiting examples, an ultrasound system 100, a coupled filtering component or device 202, or a component or subcomponent thereof, can facilitate determining whether the search for optimal motion parameters meets the one or more accomplishment criteria at 818 via, for example, control component 104, signal processing component 110, image processing component 112, and so on. It should be appreciated by one skilled in the art, upon review of the disclosed subject matter, that matching metrics other than correlation coefficients can be employed without departing from the scope of the disclosed subject matter. For instance, further non-limiting implementations can employ other matching metrics such as SSD, SAD, etc.

In addition, to determine whether the search for optimal motion parameters meets the one or more accomplishment criteria, methodologies 800 can further include at 818, determining whether a search (e.g., according to a predefined search scheme) has been adequately accomplished. As an example, exemplary predefined searches can include enumerating sets of possible motion parameters (e.g., according to a multi-scale framework or otherwise), enumerating sets of possible motion parameters under additional constraints (e.g., a tissue incompressibility constraint, etc.), deciding candidate sets of motion parameters under the guide of appropriate heuristics (e.g., gradient based methods, greedy methods, etc.) for testing coupled filtered results against one or more acceptance criteria at 814.

As yet another example, determining whether a search (e.g., according to a predefined search scheme) has been adequately accomplished can include performing the search to exhaustion (e.g., such that all possible sets of motion parameters have been tested against one or more acceptance criteria), or performing the search to some lesser extent (e.g., such that a subset of all possible sets of motion parameters are tested against one or more acceptance criteria), based on, for example, tradeoffs of compensation quality, speed, and other considerations of a system designer. Thus, according to various embodiments, the disclosed subject matter can yield a global optimum set of motion parameters (e.g., via an exhaustive search, etc.), or a local optimum (e.g., via a constrained search, etc.), depending on, for example, different search schemes or further constraints placed on a search for optimal motion parameter(s), among other factors.

If it is determined at 818 that the search for optimal motion parameters meets the one or more accomplishment criteria (e.g., a search scheme is adequately accomplished), in further non-limiting implementations, methodologies 800 can include outputting the optimal motion parameter(s) at 820. For instance, based on, for example, initialized motion parameter(s), feature-motion decorrelation present in the tissue, performance level determined by one or more acceptance criteria, optimal motion parameter(s) output at 820 can be global optimum motion parameter(s), local optimum motion parameter(s), initialized optimal motion parameter(s) at 806, updated optimal motion parameter(s) (e.g., based in part on a search constraint, one or more acceptance criteria, etc. applied via, for example, input component 102, hard coded or software applied by the equipment manufacturer or otherwise), etc. In exemplary non-limiting implementations, an ultrasound system 100, a coupled filtering component or device 202, or a component or subcomponent thereof, can facilitate outputting the optimal motion parameter(s) at 820 via, for example, control component 104, signal processing component 110, image processing component 112, and so on.

If it is determined at 818 that the search for optimal motion parameters does not meet the one or more accomplishment criteria (e.g., currently enumerated sets of possible motion parameters in a search scheme has not yet adequately compensated the feature-motion decorrelation), in further non-limiting implementations, methodologies 800 can further include adjusting motion parameter(s) at 822. As an example, for various reasons, it is possible that initialized motion parameter(s), in a first pass of coupled filtering, can produce less than a global optimum set of motion parameter(s), local optimum motion set of parameter(s), etc., or fail to otherwise achieve adequate compensation of feature-motion decorrelation. Thus, various embodiments of the disclosed subject matter can provide adjusted motion parameter(s) at 822 into methodologies 800. As a result, additional iterations of methodologies 800 can use adjusted motion parameter(s) to refine the compensation for feature-motion decorrelation. In various embodiments, an ultrasound system 100, a coupled filtering component or device 202, or a component or subcomponent thereof, can facilitate adjusting motion parameter(s) at 822 via, for example, control component 104, signal processing component 110, image processing component 112, and so on.

Exemplary Coupled Filtering Results

Exemplary embodiments of the disclosed subject matter have been explored using both simulation data and phantom data to demonstrate particular non-limiting aspects, advantages, and/or features. In addition, exemplary embodiments are demonstrated as compared with a conventional companding approach (or more generally, a warping only approach). According to an aspect, a linear convolution model can be used to simulate a 3-D image volume. FIG. 9 tabulates exemplary non-limiting 3-D ultrasound image simulation parameters.

For instance, 10,000 scatterers can be simulated following a uniform distribution in a volume of interest with associated reflectance coefficients following a Gaussian distribution and being bounded between 0 and 1. As a further example, in the volume of interest, 1,000 resolution cells and 161×161×161 voxels can be used.

Figure 10:
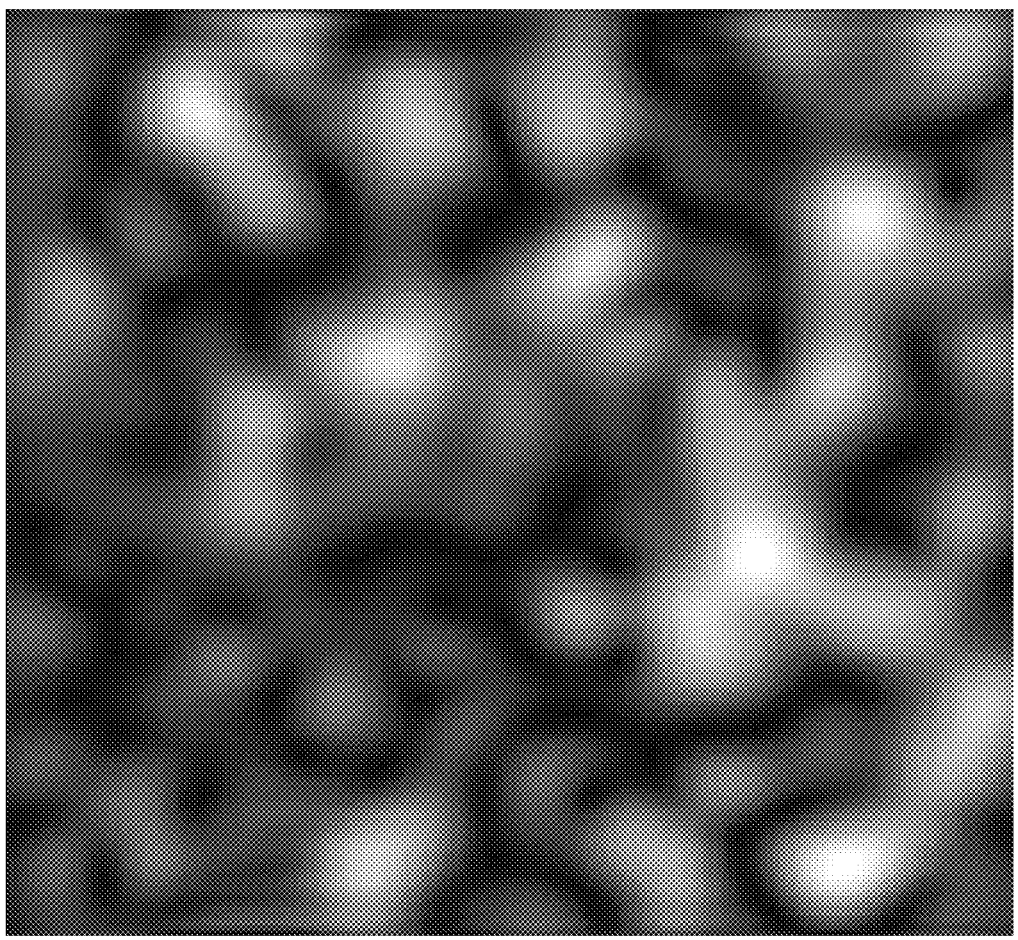
FIG. 10 depicts exemplary comparative results of the similarity between 3-D ultrasound image volume pairs by examining mean correlation coefficients, in which one slice of a simulated ultrasound image volume is depicted, and where for display purpose, an RF signal was converted to a B-Mode signal.
Figure 11:
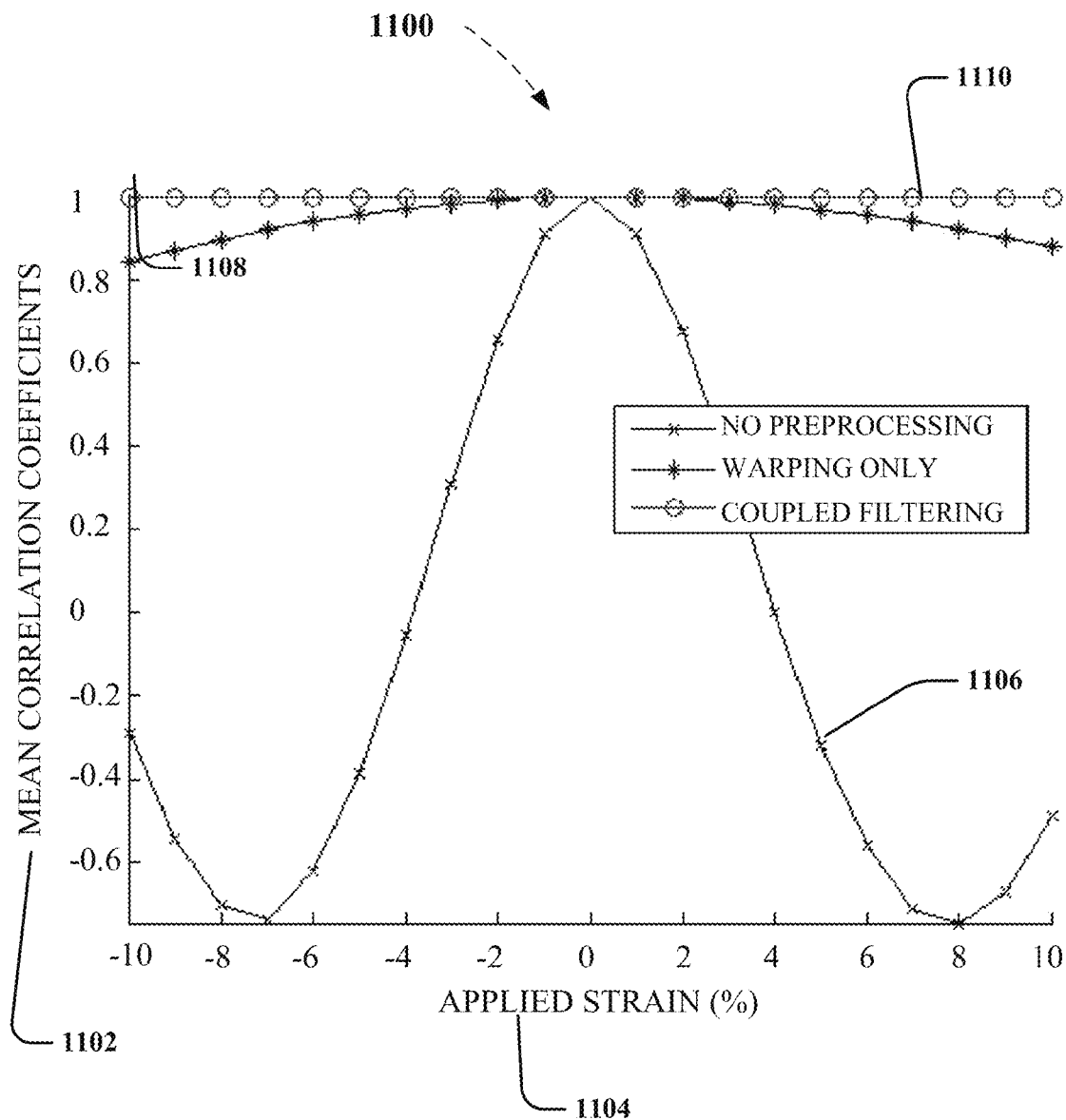
FIGS. 11-16 depict exemplary mean correlation coefficients with respect to deformation at three settings, where a higher correlation coefficient indicates a better similarity and a smaller image variation for six different cases of tissue deformation, in which axial deformation (e.g., deformation primarily along the axial direction), lateral deformation (e.g., deformation primarily along the lateral direction), axial rotation (e.g., the rotation axis is aligned to the beam direction), lateral rotation (e.g., the rotation axis is perpendicular to the beam direction), shearing along the lateral-elevational plane (e.g., the elastic axis is aligned to the beam direction) and shearing along the axial-lateral plane (e.g., the elastic axis is perpendicular to the beam direction), are depicted, respectively.
Figure 12:
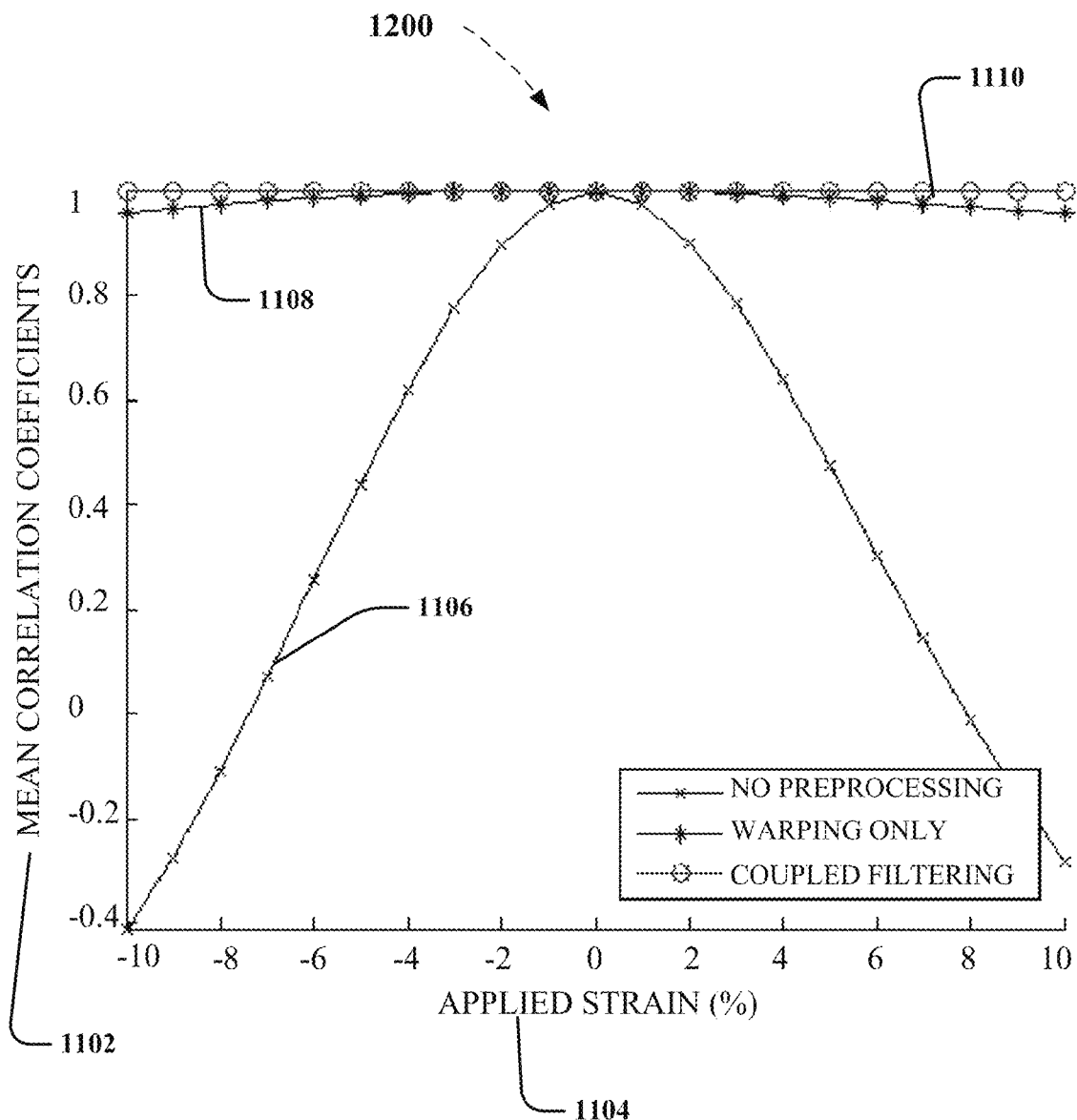
Figure 13:
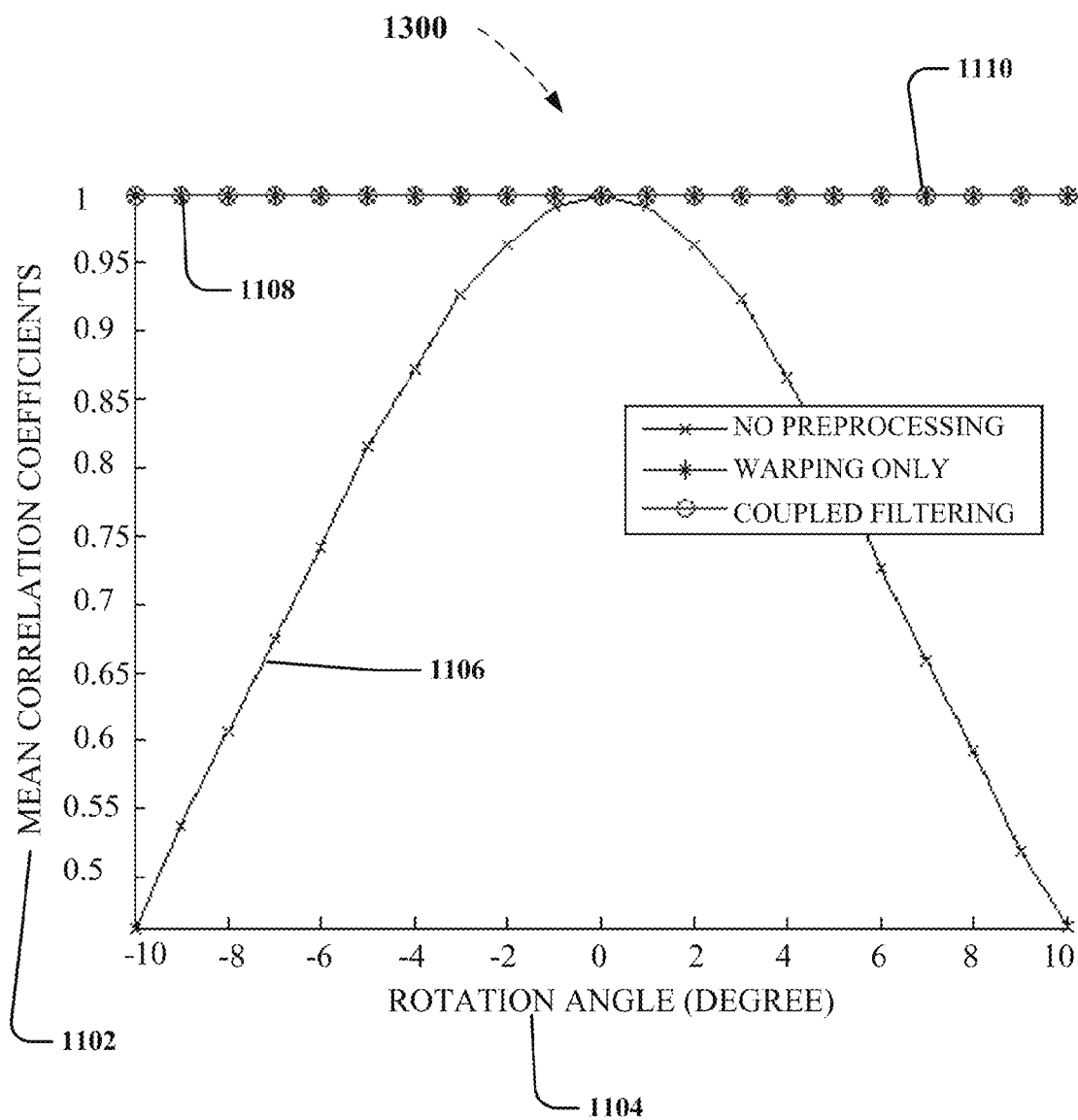
Figure 14:
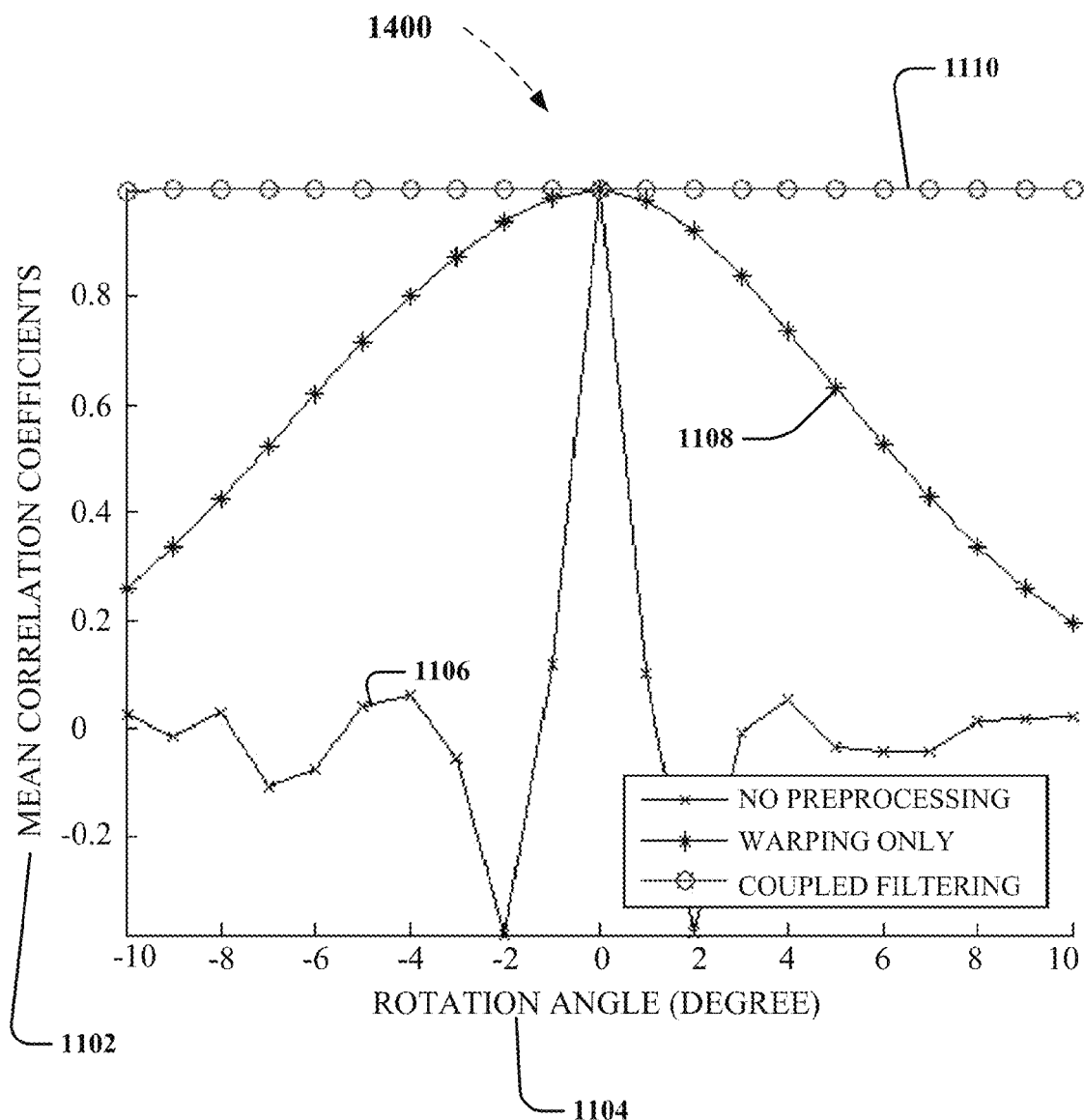
Figure 15:
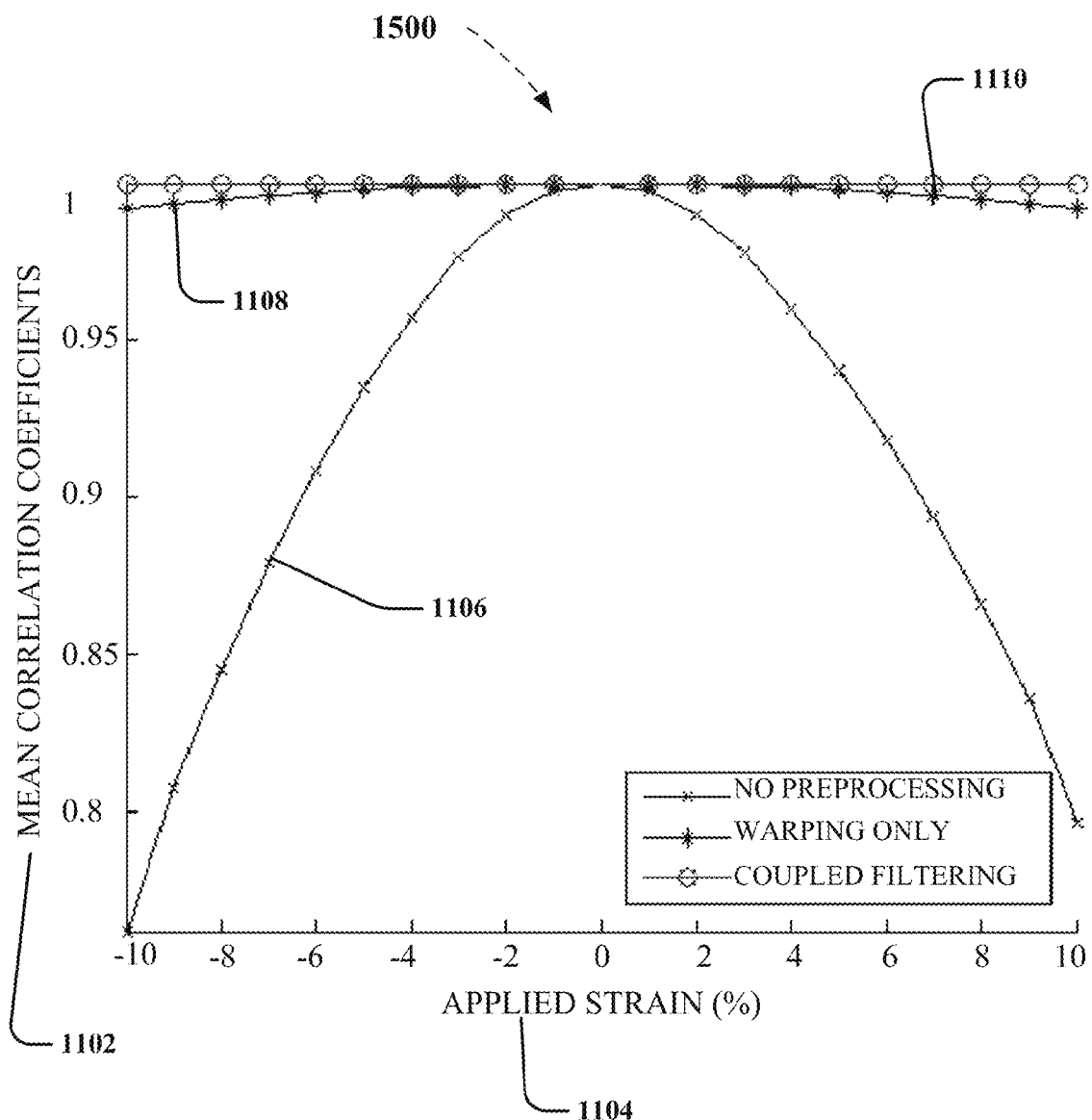
Figure 16:
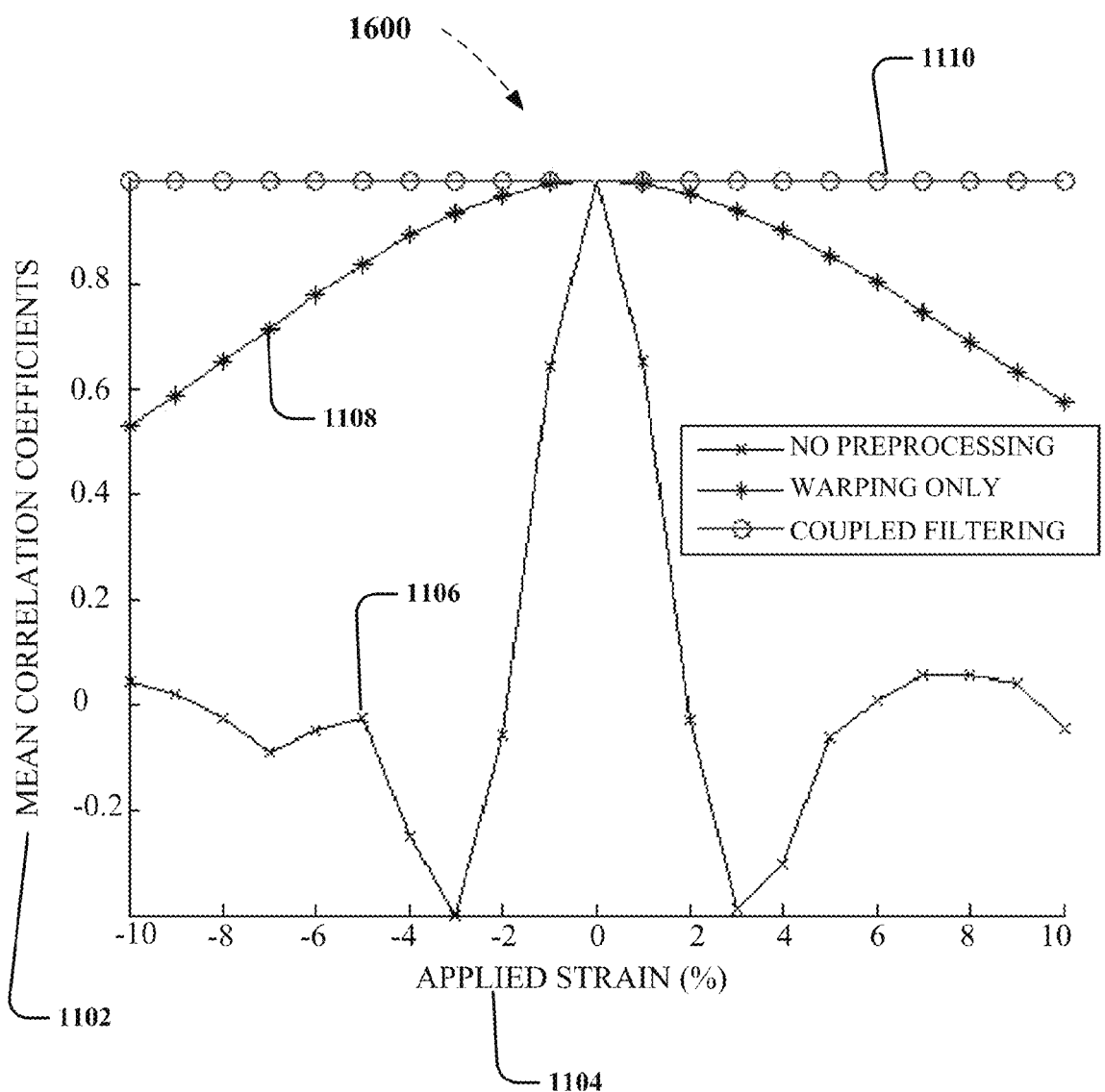

FIG. 10 depicts exemplary comparative results of the similarity between 3-D ultrasound image volume pairs by examining mean correlation coefficients, in which one exemplary slice of a simulated ultrasound image volume 900 is depicted, and where for display purpose, the RF signal was converted to a B-Mode signal.

For example, according to an aspect, after constructing a first volume (e.g., before-motion), Equation 4 can be used to simulate scatterer deformation and the linear convolution model again to construct the image volume after scatterer deformation (e.g., after-motion). It can be appreciated that there are many subclasses of affine motion.

For example, FIGS. 11-16 depict exemplary mean correlation coefficients 1102 with respect to tissue deformation 1104 (e.g., rotation angle, applied strain, etc.) at three settings, where a higher correlation coefficient indicates a better similarity and a smaller image variation (e.g., better compensation of feature-motion decorrelation) for six different cases of tissue deformation, in which axial deformation 1100 (e.g., deformation primarily along the axial direction (ad)), lateral deformation 1200 (e.g., deformation primarily along the lateral direction (ld)), axial rotation 1300 (e.g., the rotation axis is aligned to the beam direction (ar)), lateral rotation 1400 (e.g., the rotation axis is perpendicular to the beam direction (lr)), shearing along the lateral-elevational plane 1500 (e.g., the elastic axis is aligned to the beam direction (as)), and shearing along the axial-lateral plane 1600 (e.g., the elastic axis is perpendicular to the beam direction (ls)), are depicted, respectively.

Thus, while for comparison purposes, exemplary embodiments can be depicted simulating different cases of tissue deformation, various embodiments of the disclosed subject matter are not so limited. Accordingly, for the purposes of illustration and not limitation, six different matrices describing rotation, shearing, and scaling of the scatterer pattern M can be denoted as a simplified matrix, for example, as in Equations 10-15.

$$M_{cd} = \begin{bmatrix} 1-0.5\varepsilon & & \\ & 1-0.5\varepsilon & \\ & & 1+\varepsilon \end{bmatrix} \quad \text{(Eqn. 10)}$$

$$M_{l3} = \begin{bmatrix} 1-0.5\varepsilon & & \\ & 1+\varepsilon & \\ & & 1-0.5\varepsilon \end{bmatrix} \quad \text{(Eqn. 11)}$$

$$M_{cr} = \begin{bmatrix} \cos(\theta) & \sin(\theta) & \\ -\sin(\theta) & \cos(\theta) & \\ & & 1 \end{bmatrix} \quad \text{(Eqn. 12)}$$

$$M_{lr} = \begin{bmatrix} \cos(\theta) & & -\sin(\theta) \\ & 1 & \\ \sin(\theta) & & \cos(\theta) \end{bmatrix} \quad \text{(Eqn. 13)}$$

$$M_{as} = \begin{bmatrix} 1 & \varepsilon & \\ \varepsilon & 1 & \\ & & 1 \end{bmatrix} \quad \text{(Eqn. 14)}$$

$$M_{ls} = \begin{bmatrix} 1 & & \\ & 1 & \varepsilon \\ & \varepsilon & 1 \end{bmatrix} \quad \text{(Eqn. 15)}$$

with $\varepsilon$ denoting applied strains in the axial deformation, lateral deformation, lateral-elevational shearing and axial-lateral shearing, and $\theta$ denoting rotation angles in axial rotation and lateral rotation, respectively.

As further non-limiting illustrative examples, beam direction can be aligned with the z-axis, and a tissue incompressibility constraint $|M|=1$ can be employed in a simulation.

Referring again to FIGS. 11-16, $\varepsilon$ can be changed from −10% to 10% gradually with a step of 1% and $\theta$ can be changed from −10 degrees to 10 degrees gradually with a step of 1 degree to simulate different types of tissue affine motion 1104 (e.g., rotation angle, applied strain, etc.). Thus, at each step, similarity of two image volumes can be compared under different simulation settings (e.g., no-preprocessing 1106, warping only 1108, and using particular non-limiting embodiments of coupled filtering 1110 as described herein). Note from FIGS. 11-16 the similarity in warping only 1108 between I(X; $X_n$) (e.g., before-motion) and I(MX+T; $x_n$) (e.g., warped after-motion). In particular non-limiting embodiments of coupled filtering 1110 as described herein, the similarity of two filtered images can be measured (e.g., via a matching metric) instead of the original images (e.g., as in FIGS. 7-8, etc.). Note further that, for comparison purposes between warping only 1108 and particular non-limiting embodiments of coupled filtering 1110 as described herein, a pre-defined M and T can be used in warping and filtering.

According to further non-limiting aspects, in similarity comparisons (e.g., such as in a determination whether coupled filtering results meet one or more acceptance criteria, etc.), a cubic window of 17×17×17 voxels from the first image volume (e.g., before-motion) can be used as the source to compare with the corresponding window (e.g., using a pre-defined M and T, etc.) from the second image volume (e.g., after-motion). After going through 7×7×7=343 windows in the central part of the first image volume, the average of the correlation coefficients in these 343 windows can be calculated with their relationship plotted 1000 with respect to tissue deformation 1104 (e.g., rotation angle, applied strain, etc.) in FIGS. 11-16. Note that, in further non-limiting aspects, windows in the center of the images can be preferentially chosen to avoid associated boundary problems.

From FIGS. 10-16, it can be seen that, for the comparison of image volumes without any pre-processing 1106, the correlation between two images decreases very quickly (e.g., poor compensation of feature-motion decorrelation). Note that a "zig-zag" structure, in illustrative embodiments, is caused by phase periodicity in the RF signal. In the warping only approach 1108, the correlation coefficient decreases at a slower pace (e.g., some improvement of compensation of feature-motion decorrelation over no preprocessing 1106). However, significant feature-motion decorrelation remains in the warping only approach 1108. In contrast, in particular non-limiting embodiments of coupled filtering 1110 compensation of feature-motion decorrelation as described herein, the mean correlation coefficient 1102 remains very close to the ideal value of 1.0 (e.g., enhanced compensation of feature-motion decorrelation), even when the deformation is up to 10% or the rotation angle is up to 10 degrees.

Figure 17:
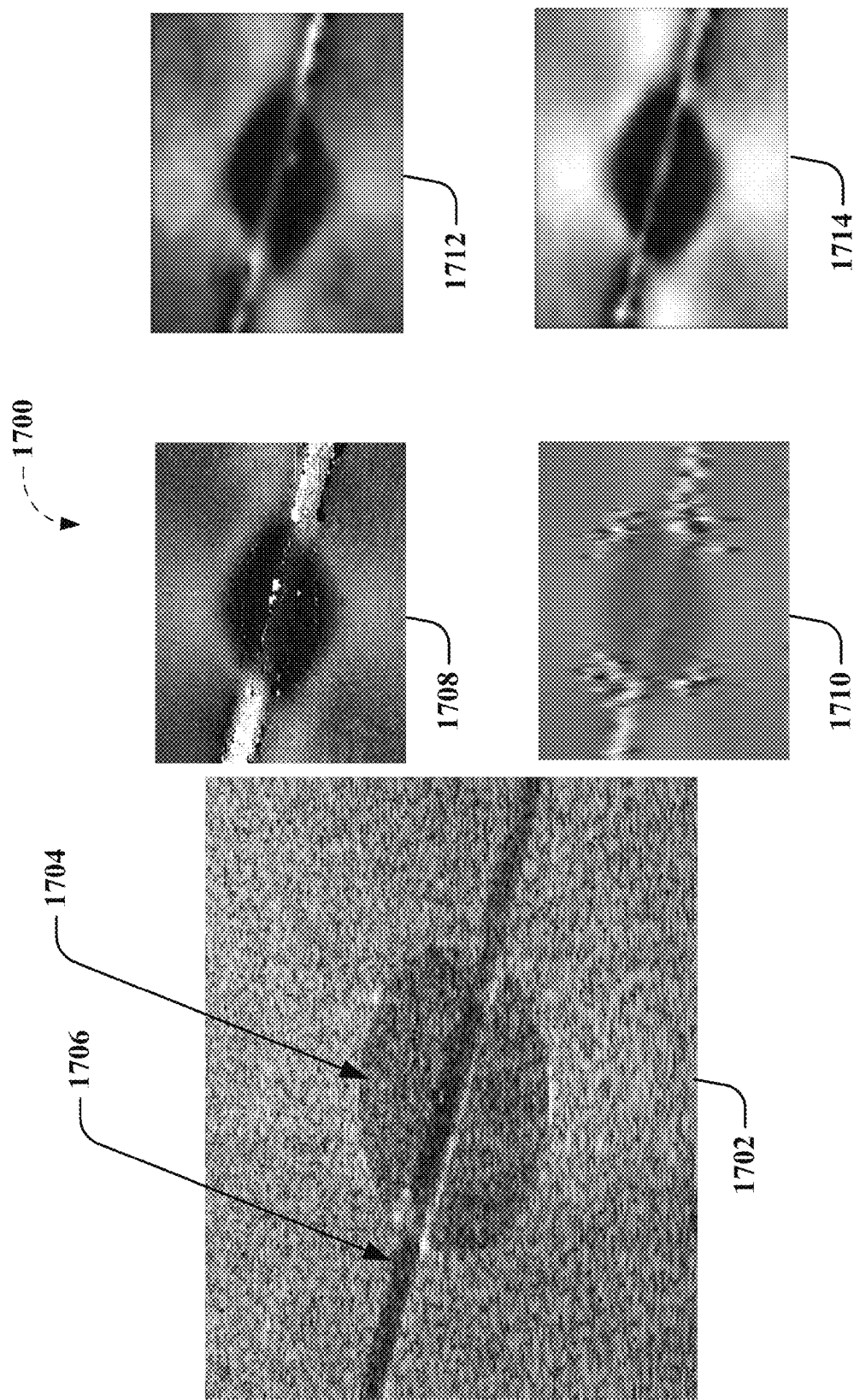
FIG. 17 depicts exemplary comparative results of an elastography study for a phantom image, where for display purpose, the RF signal was converted to a B-Mode signal (after taking the logarithm) for illustrative purposes.

FIG. 17 depicts exemplary comparative results 1700 of an elastography study for an image 1702 (e.g., before-motion) of a gelatin phantom, where for display purpose, the RF signal was converted to a B-Mode signal (after taking the logarithm) for illustrative purposes. For instance, in FIG. 17, an image 1702 having three regions with different stiffness values from outside to inside (e.g., a gelatin phantom, a stiff circular area 1704, and a thin, fluid-filled channel 1706). After compressing the gelatin phantom downward, another image (e.g., 1708, 1710, 1712, and 1714) can be taken (e.g., after-motion), for the purpose of deriving the strain distribution using the before-motion image information and the respective after-motion image information. For the purposes of illustration and not limitation, a 2% compression (e.g., 1708 and 1712) and a 5% compression case were studied (e.g., 1710 and 1714) for both the companding approach (e.g., 1708 and 1710) and for a particular non-limiting embodiment of coupled filtering compensation (e.g., 1712 and 1714) of feature-motion decorrelation as described herein.

As can be seen from FIG. 17, in the 2% compression case, both the companding approach (e.g., 1708) and the particular non-limiting embodiment of coupled filtering compensation (e.g., 1712) provide reasonable strain estimation results. The simulation results as described regarding FIG. 10 reveal similar results, where mean correlation coefficient 1102 between two images is very close to 1.0 at 2% compression using the warping only approach 1108. Note further that the particular non-limiting embodiment of coupled filtering compensation (e.g., 1712) can characterize the soft channel 1706 better than the companding approach. Thus, according to various aspects, particular non-limiting embodiments of coupled filtering compensation can advantageously provide improved contrast in compensation of feature-motion decorrelation of adjacent areas having different feature motion as a result of, for example, different stiffness values.

In the more difficult 5% compression case, the particular non-limiting embodiment of coupled filtering compensation (e.g., 1714) can clearly outperform the companding approach (e.g., 1710) as evidenced by the strong contrast among different areas with different stiffness values.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may utilize functionality for compensation of feature-motion decorrelation and/or coupled filtering as described for various embodiments of the subject disclosure.

Figure 18:
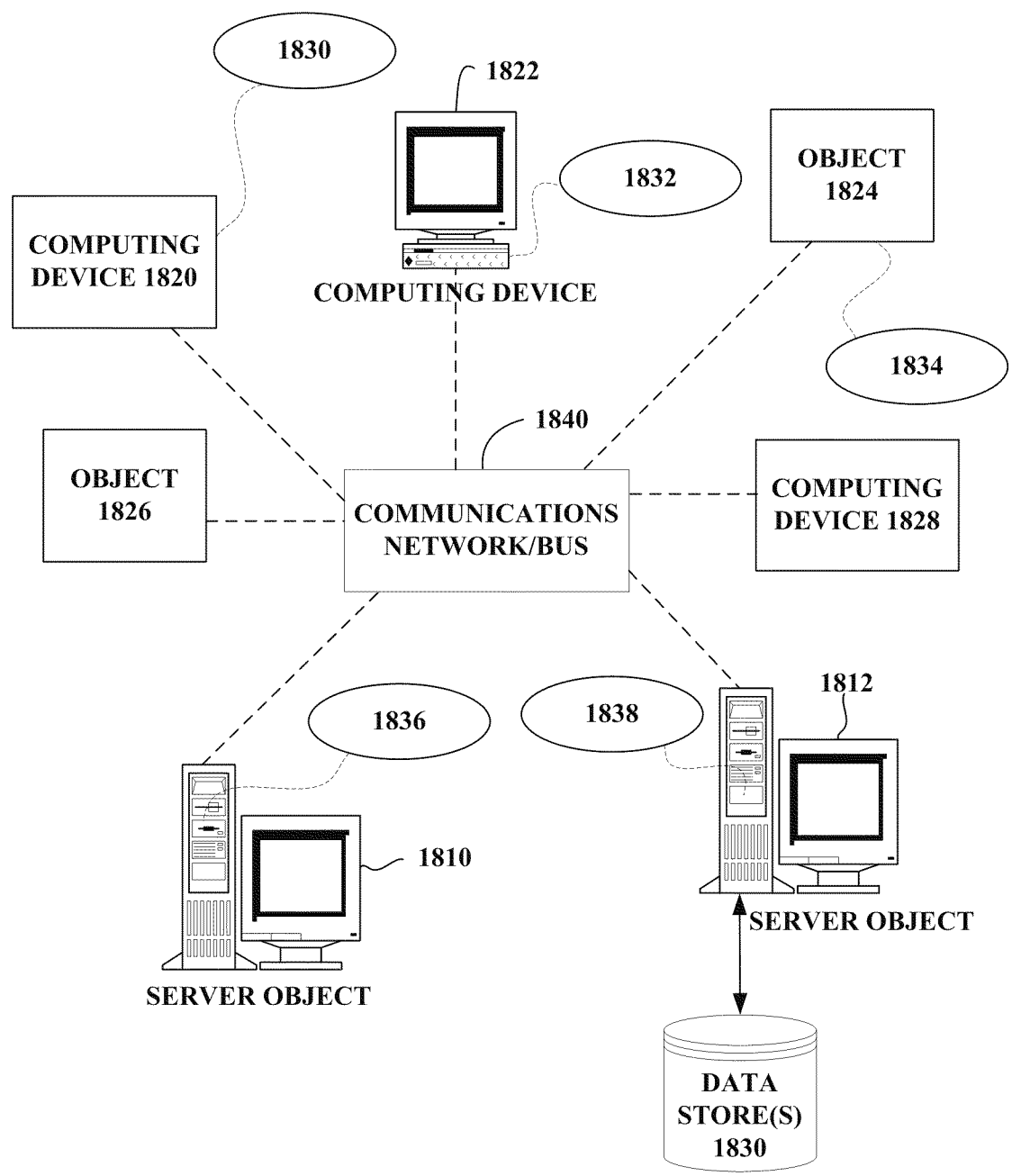
FIG. 18 is a block diagram representing exemplary non-limiting networked environments in which various embodiments described herein can be implemented.

FIG. 18 provides a schematic diagram of an exemplary networked or distributed computing environment. The distributed computing environment comprises computing objects 1810, 1812, etc. and computing objects or devices 1820, 1822, 1824, 1826, 1828, etc., which may include programs, methods, data stores, programmable logic, etc., as represented by applications 1830, 1832, 1834, 1836, 1838. It can be appreciated that objects 1810, 1812, etc. and computing objects or devices 1820, 1822, 1824, 1826, 1828, etc. may comprise different devices, such as PDAs, audio/video devices, mobile phones, MP3 players, personal computers, laptops, etc.

Each object 1810, 1812, etc. and computing objects or devices 1820, 1822, 1824, 1826, 1828, etc. can communicate with one or more other objects 1810, 1812, etc. and computing objects or devices 1820, 1822, 1824, 1826, 1828, etc. by way of the communications network 1840, either directly or indirectly. Even though illustrated as a single element in FIG.

18, network 1840 may comprise other computing objects and computing devices that provide services to the system of FIG. 18, and/or may represent multiple interconnected networks, which are not shown. Each object 1810, 1812, etc. or 1820, 1822, 1824, 1826, 1828, etc. can also contain an application, such as applications 1830, 1832, 1834, 1836, 1838, that might make use of an API, or other object, software, firmware and/or hardware, suitable for communication with or implementation of the functionality for compensation of feature-motion decorrelation and/or coupled filtering functionality provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to functionality for compensation of feature-motion decorrelation and/or coupled filtering as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 18, as a non-limiting example, computers 1820, 1822, 1824, 1826, 1828, etc. can be thought of as clients and computers 1810, 1812, etc. can be thought of as servers where servers 1810, 1812, etc. provide data services, such as receiving data from client computers 1820, 1822, 1824, 1826, 1828, etc., storing of data, processing of data, transmitting data to client computers 1820, 1822, 1824, 1826, 1828, etc., although any computer can be considered a client, a server, or both, depending on the circumstances. Any of these computing devices may be processing data, forming metadata, synchronizing data or requesting services or tasks that may implicate compensation of feature-motion decorrelation and/or coupled filtering as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing compensation of feature-motion decorrelation and/or coupled filtering can be provided standalone, or distributed across multiple computing devices or objects.

In a network environment in which the communications network/bus 1840 is the Internet, for example, the servers 1810, 1812, etc. can be Web servers with which the clients 1820, 1822, 1824, 1826, 1828, etc. communicate via any of a number of known protocols, such as the hypertext transfer protocol (HTTP). Servers 1810, 1812, etc. may also serve as clients 1820, 1822, 1824, 1826, 1828, etc., as may be characteristic of a distributed computing environment.

Exemplary Computing Device

Figure 19:
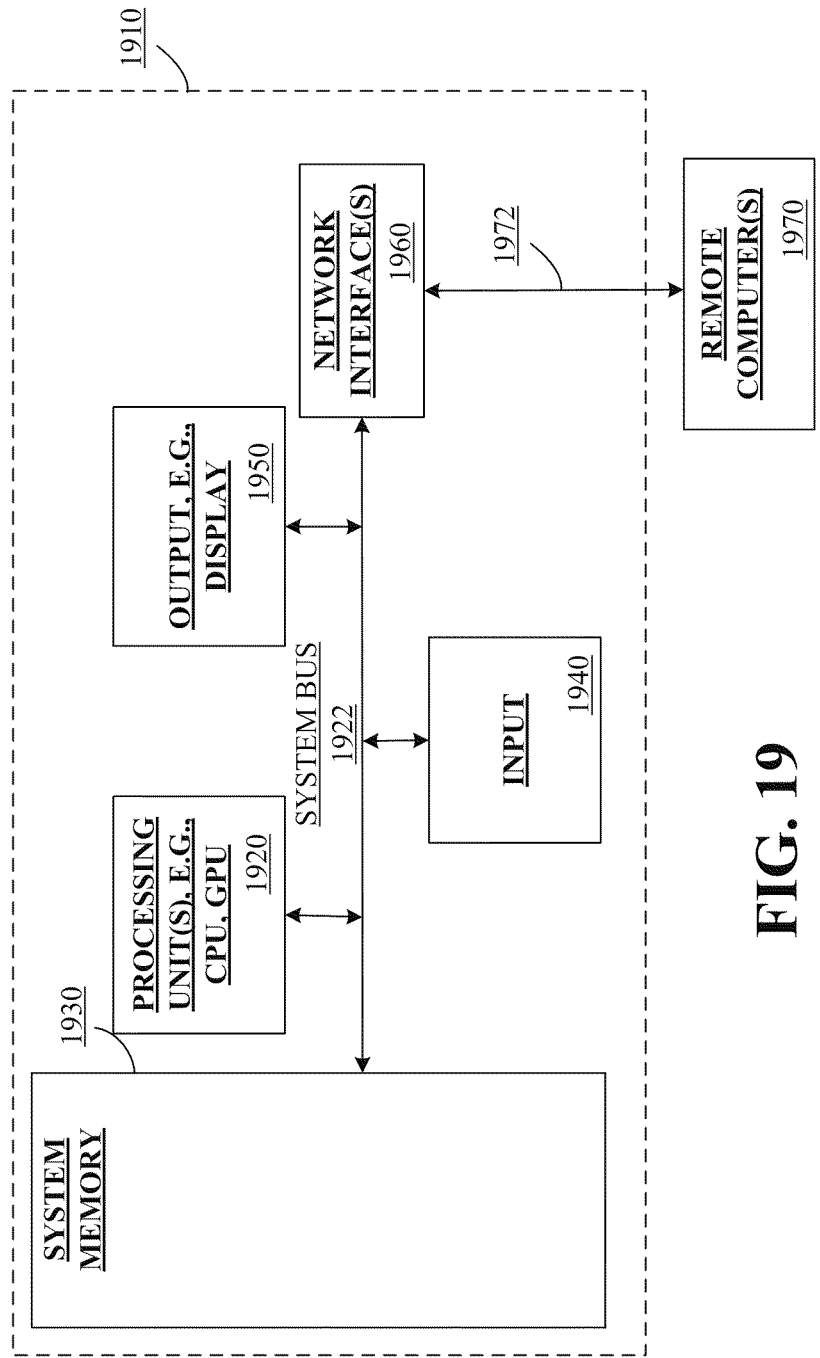
FIG. 19 is a block diagram representing an exemplary non-limiting computing system or operating environment in which one or more aspects of various embodiments described herein can be implemented.

As mentioned, advantageously, the techniques described herein can be applied to any device where it is desirable to perform compensation of feature-motion decorrelation and/or coupled filtering. It should be understood, therefore, that handheld, portable and other computing devices and computing objects of all kinds are contemplated for use in connection with the various embodiments, e.g., anywhere that a device may wish to synchronize data. Accordingly, the below general purpose remote computer described below in FIG. 19 is but one example of a computing device. Additionally, functionality for compensation of feature-motion decorrelation and/or coupled filtering can include one or more aspects of the below general purpose computer, such as display or output of the façades being modeled via the display 1950.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

FIG. 19 thus illustrates an example of a suitable computing system environment 1900 in which one or aspects of the embodiments described herein can be implemented, although as made clear above, the computing system environment 1900 is only one example of a suitable computing environment and is not intended to suggest any limitation as to scope of use or functionality. Neither should the computing environment 1900 be interpreted as having any dependency or requirement relating to any one or combination of components illustrated in the exemplary operating environment 1900.

With reference to FIG. 19, an exemplary remote device for implementing one or more embodiments includes a general purpose computing device in the form of a computer 1910. Components of computer 1910 may include, but are not limited to, a processing unit 1920, a system memory 1930, and a system bus 1922 that couples various system components including the system memory to the processing unit 1920.

Computer 1910 typically includes a variety of computer readable media and can be any available media that can be accessed by computer 1910. The system memory 1930 may include computer storage media in the form of volatile and/or nonvolatile memory such as read only memory (ROM) and/or random access memory (RAM). By way of example, and not limitation, memory 1930 may also include an operating system, application programs, other program modules, and program data.

A user can enter commands and information into the computer 1910 through input devices 1940. A monitor or other type of display device is also connected to the system bus 1922 via an interface, such as output interface 1950. In addition to a monitor, computers can also include other peripheral output devices such as speakers and a printer, which may be connected through output interface 1950.

The computer 1910 may operate in a networked or distributed environment using logical connections to one or more other remote computers, such as remote computer 1970. The remote computer 1970 may be a personal computer, a server, a router, a network PC, a peer device or other common network node, or any other remote media consumption or transmission device, and may include any or all of the elements described above relative to the computer 1910. The logical connections depicted in FIG. 19 include a network 1972, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to perform compensation of feature-motion decorrelation and/or coupled filtering.

Also, there are multiple ways to implement the same or similar functionality, e.g., an appropriate API, tool kit, driver code, operating system, control, standalone or downloadable software object, etc. which enables applications and services to use the functionality for compensation of feature-motion decorrelation and/or coupled filtering functionality. Thus, embodiments herein are contemplated from the standpoint of an API (or other software object), as well as from a software or hardware object that implements one or more aspects of compensation of feature-motion decorrelation and/or coupled filtering as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art. In addition to the various embodiments described herein, it is to be understood that other similar embodiments can be used or modifications and additions can be made to the described embodiment(s) for performing the same or equivalent function of the corresponding embodiment(s) without deviating therefrom.

For example, while various embodiments of the disclosed subject matter have been described in the context of the RF signal modality of the ultrasound images, most end user interactions with standard ultrasound machines use the B-Mode signal modality. In conventional ultrasound machines, conversion from RF signal to B-Mode signal is performed inside the imaging instrument. However, it is contemplated that applications of various aspects of the disclosed subject matter can be retrofitted or incorporated in conventional ultrasound machines for instance, by add-on modules, add-on controls, hardware and or software upgrades. Alternatively or additionally, it is contemplated that, some aspects of the disclosed subject matter can be applicable to the B-Mode signal modality.

As a further example, illustrative embodiments of the disclosed subject matter have been described in the context of a linear convolution model, which linear convolution model provides an adequate approximation of the ultrasound imaging process in the far field of the transducer. However, it is contemplated that other non-linear convolution models can also be applied according to various aspects without departing from the scope of the disclosed subject matter described herein.

As another example, exemplary implementations of the disclosed subject matter have been described in the context of both 2-D and 3-D ultrasound images. In an aspect, 3-D simulation data and 2-D elastography data have been demonstrated. For the avoidance of doubt, embodiments of the disclosed subject matter are intended to include both 2-D and 3-D ultrasound imaging (e.g., 3-D echocardiography images, etc.). Moreover, while illustrative embodiments have been described in the context of compensation of feature-motion decorrelation in ultrasound image analysis, it is contemplated that various aspects of the disclosed subject can find application in other areas of 2-D and 3-D image analysis (e.g., satellite imaging, target image analysis and targeting, radar, sonar, any other image analysis discipline that can benefit from compensation of feature-motion decorrelation, and so on, etc.).

In a further example, various embodiments of the disclosed subject matter have been described in the context of simulations coded in an interpreted language and using test data. As speed is of the essence in clinical applications, improvements of existing algorithms are contemplated which can include, without limitation, coding algorithms in native machine code, hand optimizing code bottlenecks, accelerating parameter updating procedures, etc.

In still further examples, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A method that facilitates compensation of feature-motion decorrelation, comprising:
   performing, by a device comprising a processor, image warping on a subset of image information associated with a first image from a pair of images to generate a warped subset of the image information associated with the pair of images;
   filtering, via a first filtering process, the warped subset of the image information based at least in part on at least one initialized motion parameter to generate filtering results;
   filtering, via a second filtering process that is a modified version of the first filtering process, another subset of the image information associated with a second image from the pair of images to generate other filtering results;
   updating the at least one initialized motion parameter based in part on the filtering results to create at least one updated motion parameter associated with a difference between the pair of images; and
   outputting the at least one updated motion parameter in response to a determination that the at least one updated motion parameter satisfies at least one accomplishment criterion.

2. The method of claim 1, further comprising:
   initializing at least one motion parameter to create the at least one initialized motion parameter.

3. The method of claim 2, wherein the initializing includes initializing at least one matrix.

4. The method of claim 1, further comprising:
   receiving the first image and the second image as the image information, wherein the first image is generated before a motion of interest of an object and the second image is generated after the motion of interest of the object.

5. The method of claim 1, wherein the filtering the warped subset of the image information includes filtering the warped subset of the image information based on a point spread function (PSF).

6. The method of claim 5, wherein the performing the image warping on the subset of the image information includes performing affine warping on the subset of the image information to create affine warped image information.

7. The method of claim 5, wherein the filtering the warped subset of the image information includes filtering the warped subset of the image information based on a Gaussian-weighted cosine function.

8. The method of claim 1, wherein the filtering the other subset of the image information includes filtering the other subset of the image information with a modified point spread function (PSF).

9. The method of claim 8, wherein the filtering the other subset of the image information with the modified PSF includes filtering the other subset of the image information with an affine warped point spread function.

10. The method of claim 8, wherein the filtering the other subset of the image information with the modified PSF includes filtering the other subset of the image information with an affine warped Gaussian-weighted cosine function.

11. The method of claim 8, wherein the filtering the other subset of the image information includes filtering the other subset of the image information with a modified PSF that comprises a set of motion parameters in common with a warping operation employed to create the warped subset of the image information.

12. The method of claim 1, wherein the determination that the at least one updated motion parameter satisfies the at least one accomplishment criterion includes at least one of enumerating possible sets of motion parameters in a multi-scale framework, enumerating possible sets of motion parameters without a multi-scale framework, enumerating possible sets of motion parameters under at least one additional constraint, enumerating possible sets of motion parameters under a tissue incompressibility constraint, or enumerating candidate sets of motion parameters, which are determined based in part on at least one heuristic.

13. The method of claim 1, further comprising:
   retaining the at least one updated motion parameter in response to a determination that the at least one updated motion parameter does not satisfy the at least one accomplishment criterion.

14. The method of claim 1, further comprising:
   adjusting the at least one updated motion parameter to create at least one adjusted motion parameter based on the determination that the at least one updated motion parameter satisfies the at least one accomplishment criterion.

15. The method of claim 1, further comprising:
   repeating filtering on the image information by updating at least one adjusted motion parameter.

16. The method of claim 1, wherein the updating includes updating the at least one initialized motion parameter with at least one adjusted motion parameter.

17. The method of claim 1, wherein the updating includes updating the at least one initialized motion parameter based in part on computing a matching metric between the filtering results to create the at least one updated motion parameter.

18. The method of claim 17, wherein the computing the matching metric includes calculating, at least one of correlation coefficients, sum of squared distance, or the sum of absolute distance between the filtering results.

19. The method of claim 18, wherein the outputting the at least one updated motion parameter includes outputting the at least one updated motion parameter in response to a determination that the matching metric associated with the at least one updated motion parameter exceeds a threshold level.

20. A coupled filtering device that facilitates compensation of feature-motion decorrelation, comprising;
   an image warping component configured to warp a first subset of input image information associated with a first image to produce a warped first subset of the input image information; and
   a filtering component configured to filter a second subset of the input image information associated with a second image based at least in part on at least one initialized motion parameter via a first filtering process, and configured to filter the warped first subset of the input image information associated with the first image via a second filtering process to obtain filtering results.

21. The coupled filtering device of claim 20, wherein the image warping component is configured to affine warp the first subset of input image information to produce the warped first subset of the input image information, and the filtering component is configured to filter the warped first subset of the input image information with a point spread function (PSF) and to filter the second subset of input image information with a modified PSF.

22. The coupled filtering device of claim 20, further comprising:
a management component configured to generate an update to the at least one initialized motion parameter based in part on the filtering results.

23. The coupled filtering device of claim 22, wherein the management component is further configured to determine whether the filtering results meet at least one acceptance criterion.

24. The coupled filtering device of claim 23, wherein the management component is further configured to update the at least one initialized motion parameter in response to a determination that the filtering results meet the at least one acceptance criterion and to retain the at least one initialized motion parameter in response to a determination that the filtering results do not meet the at least one acceptance criterion.

25. A device, comprising:
a memory that stores computer-executable components; and
a processor, communicatively coupled to the memory, that executes or facilitates execution of the computer-executable components, the computer-executable components including:
a computerized component that performs a first filtering operation on first image information associated with a before-motion image based on a first filter and a set of motion parameters, and a second filtering operation on warped second image information associated with an after-motion image based on a second filter to create filtering results, wherein a warping operation that creates the warped second image information and the first filtering operation share the set of motion parameters, wherein the set of motion parameters facilitate calculation of a matching metric for the filtering results, and wherein the second filtering operation is a modified version of the first filtering operation.

26. The device of claim 25, wherein the warping operation is an affine warping operation, the second filtering operation includes a Gaussian-weighted cosine filtering of the warped second image information, and the first filtering operation includes an affine modified Gaussian-weighted cosine filtering of the first image information.

27. The device of claim 25 further comprising:
a management component that generates an update to at least one motion parameter of the set of motion parameters based in part on the filtering results.

28. The device of claim 25, wherein the management component is further configured to perform a predefined search for updating the set of motion parameters.

29. The device of claim 28, wherein the management component is further configured to determine whether the filtering results produce at least one update candidate that satisfies at least one defined criterion for at least one of the set of motion parameters.

30. The device of claim 29, wherein the management component is further configured to generate at least one update to the at least one of the set of motion parameters from the at least one update candidate.

31. The device of claim 30, wherein the management component is further configured to output the at least one update to the at least one of the set of motion parameters in response to a determination that the predefined search is accomplished, and the management component is configured to adjust the at least one of the set of motion parameters in response to a determination that the predefined search is not accomplished.

32. The device of claim 25, wherein the computerized component receives the first image information before a motion of interest of an object associated with the before-motion image.

* * * * *